(12) United States Patent
Yokota et al.

(10) Patent No.: US 7,898,570 B2
(45) Date of Patent: Mar. 1, 2011

(54) DIGITAL CAMERA SYSTEM WITH MEANS FOR RESTRICTING IMAGE ACQUISITION

(75) Inventors: Kaoru Yokota, Hyogo (JP); Yuichi Futa, Osaka (JP); Toshihisa Nakano, Osaka (JP); Motoji Ohmori, Osaka (JP); Shuichi Ohki, Osaka (JP)

(73) Assignee: Panasonic Corporation, Osaka (JP)

( * ) Notice: Subject to any disclaimer, the term of this patent is extended or adjusted under 35 U.S.C. 154(b) by 1015 days.

(21) Appl. No.: 10/578,896

(22) PCT Filed: Nov. 16, 2004

(86) PCT No.: PCT/JP2004/017327

§ 371 (c)(1),
(2), (4) Date: Mar. 20, 2007

(87) PCT Pub. No.: WO2005/050975

PCT Pub. Date: Jun. 2, 2005

(65) Prior Publication Data

US 2007/0216775 A1    Sep. 20, 2007

(30) Foreign Application Priority Data

Nov. 19, 2003    (JP) .............................. 2003-389927

(51) Int. Cl.
   *H04N 5/225*    (2006.01)
(52) U.S. Cl. ............... 348/207.1; 348/222.1; 348/584; 348/586; 348/587

(58) Field of Classification Search .............. 348/207.1, 348/222.1, 584, 586, 587
See application file for complete search history.

(56) References Cited

U.S. PATENT DOCUMENTS

| 6,397,334 | B1 | 5/2002 | Chainer et al. |
| 6,853,750 | B2 * | 2/2005 | Aoki ........................ 382/190 |
| 6,993,188 | B2 | 1/2006 | Aoki |
| 2002/0039479 | A1 | 4/2002 | Watanabe et al. |
| 2005/0286883 | A1 | 12/2005 | Abe et al. |

FOREIGN PATENT DOCUMENTS

| EP | 1 076 316 A2 | 2/2001 |
| JP | 2001-169175 | 6/2001 |
| JP | 2001-320702 | 11/2001 |
| WO | 2004/080064 A1 | 9/2004 |

* cited by examiner

*Primary Examiner* — Yogesh K Aggarwal
(74) *Attorney, Agent, or Firm* — Wenderoth, Lind & Ponack, L.L.P.

(57) ABSTRACT

A digital camera comprising: an imaging unit operable to generate an image by photographing an object; a receiving unit operable to receive information relating to image processing from one or more transmission devices; a judging unit operable to judge whether the image is to be output or not, based on the information received by the receiving unit; and an output unit operable to, in accordance with the judgment made by the judging unit, output the image to a memory, or discard the image, where the memory is readable by the digital camera or an external device.

7 Claims, 17 Drawing Sheets

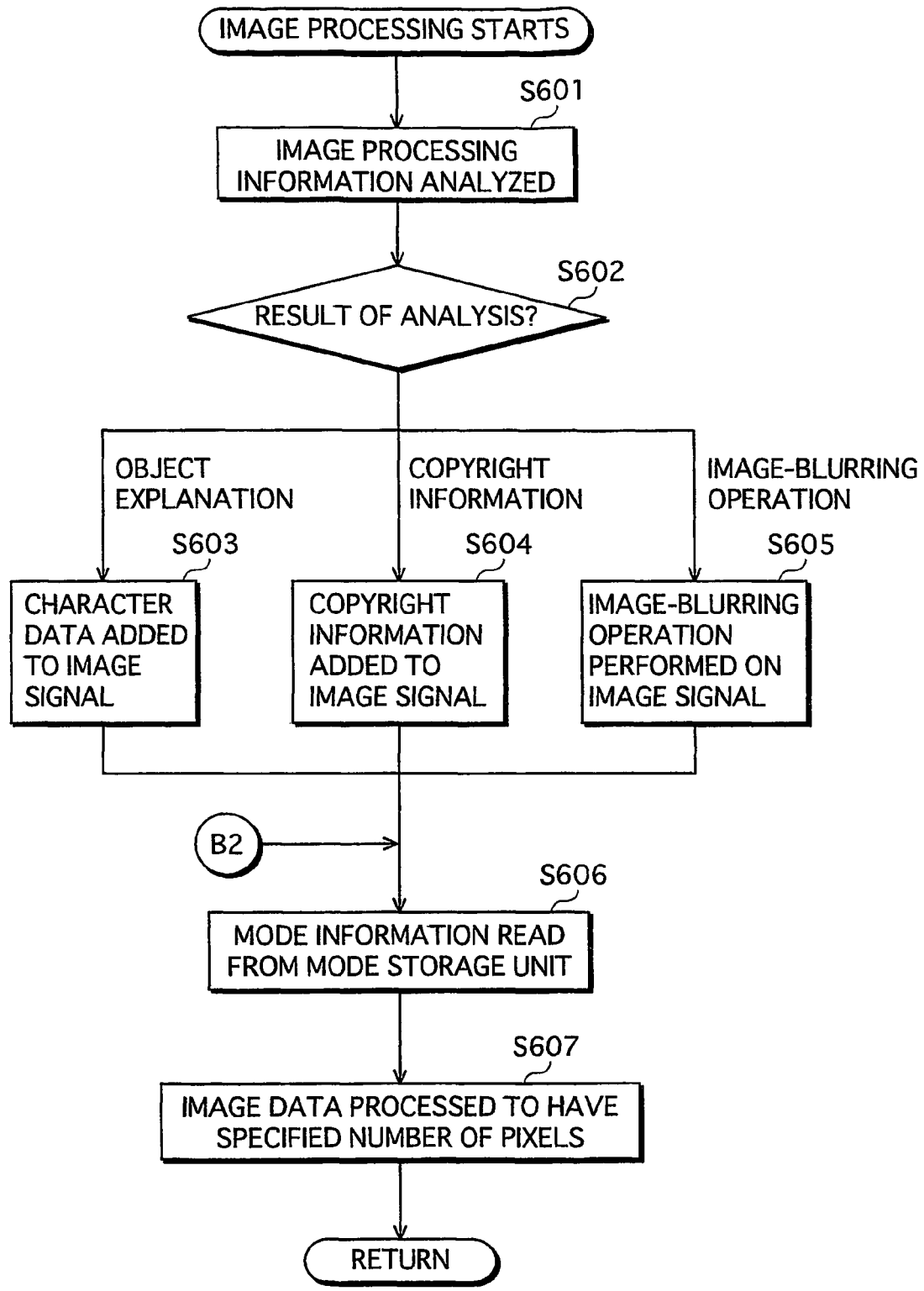

DIGITAL CAMERA SYSTEM WITH MEANS FOR RESTRICTING IMAGE ACQUISITION

TECHNICAL FIELD

The present invention relates to a digital camera that generates image data by photographing an object, especially to a technique to perform image processing on image data generated by the digital camera.

BACKGROUND ART

In recent years, digital cameras and camera-equipped mobile telephones have rapidly become common.

A typical digital camera has a function of adding extra information such as a date and a time at which an image is taken, a condition under which the image is taken, and a place at which the image is taken, to the image according to a user's input, and a function of performing image processing on the image according to a user's input designating a compression format, a compression rate or the like.

Here, since digital cameras and camera-equipped mobile telephones are compact, it is difficult to completely prevent photographing an object using digital cameras and camera-equipped mobile telephones at a place such as a museum, where photography is prohibited. Furthermore, "digital shoplifting" at a bookshop has recently emerged as a problem. Here, digital shoplifting means a conduct of photographing, for example, an article in a magazine at a bookshop without purchasing the magazine, using a digital camera or camera-equipped mobile telephone. Japanese patent application publication No. 2001-320702 (a patent document 1) discloses a technique to prevent photographing by means of a digital camera or camera-equipped mobile telephone at a place where photography is prohibited and digital shoplifting, using the above-mentioned functions.

The patent document 1 discloses that a tag which has a blinking infrared light emitting diode (LED) is attached to an object. When a user photographs the object using a digital camera, the digital camera reads a blinking pattern of the infrared LED. Then, the digital camera adds extra information shown by the blinking pattern to an image of the object, or subjects the image to image processing shown by the blinking pattern.

According to this technique, however, the digital camera is required to capture and store a moving image, even when the user desires only a still image, since the digital camera needs to read the blinking pattern of the infrared LED. Therefore, the digital camera needs to be equipped with a memory with a capacity large enough to be able to store a moving image.

Furthermore, the user can intentionally make the blinking pattern unreadable from the digital camera, by covering the tag with something or photographing the object from a particular angle. If such is the case, the digital camera does not read the blinking pattern, and therefore does not perform image processing, even if required.

SUMMARY DISCLOSURE OF THE INVENTION

In light of the above problems, an object of the present invention is to provide a digital camera system which performs image processing on an image obtained by a digital camera in accordance with acquired information relating to image processing, without a need of obtaining and storing a moving image, and regardless of a user's intention.

The object can be achieved by a digital camera comprising: an imaging unit operable to generate an image by photographing an object; a receiving unit operable to receive information relating to image processing from one or more transmission devices; a judging unit operable to judge whether the image is to be output or not, based on the information received by the receiving unit; and an output unit operable to, in accordance with the judgment made by the judging unit, output the image to a memory, or discard the image, the memory being readable by the digital camera or an external device.

Here, the judging unit may further judge whether the image is to be processed or not, and the output unit may output the image to the memory without processing, or processes and outputs the image to the memory, in accordance with the judgment made by the judging unit.

According to this construction, the digital camera determines how to treat the image obtained by photographing the object. If the digital camera judges that the image should be subjected to image processing before being output, the digital camera can perform image processing on the image regardless of a user's intention.

Here, the receiving unit may include: a first receiving unit operable to receive first information from a first transmission device; and a second receiving unit operable to receive second information indicating image modification corresponding to the object from a second transmission device. Here, the judging unit may make the judgment based on the first information, and if the judging unit judges that the image is to be processed and output, the output unit may perform the image modification indicated by the second information on the image, and outputs the modified image to the memory.

According to this construction, the first information is used to judge whether image processing should be performed on the image, or whether the image should be discarded. On the other hand, the second information indicates what kind of image processing should be performed. In this way, combinations of the first information and the second information can realize various systems.

Here, the output unit may perform the image modification to make the image visually distinguishable.

According to this construction, the digital camera performs image processing on the image, to make the image visually distinguishable. In this way, even if the digital camera is used to photograph an object despite of prohibition, the digital camera can perform an image-blurring operation on an image of the object, thereby making it difficult to recognize the object in the image. This technique can be utilized to protect a copyright and a right of publicity.

Here, when the second receiving unit receives the second information, the judging unit may examine whether the first receiving unit has received the first information, and if the first receiving unit has received the first information, the judging unit may judge that the image is to be processed and output.

According to this construction, the digital camera can judge whether to perform image processing on the image, depending on whether having received the first information or not.

The first transmission device is, for example, provided at an entrance of a bookshop. When a user carrying the digital camera enters the bookshop, the digital camera receives the first information regardless of the user's intention. Here, the second transmission device may be attached to a book, a magazine and the like in the bookshop. If the user utilizes the digital camera to photograph a book or the like, the digital camera receives the second information regardless of the user's intention. The digital camera then performs image processing on an image obtained by the photographing. Thus, "digital shoplifting" can be prevented.

Here, the first information may include information indicating image modification. Furthermore, when the second receiving unit receives the second information, the judging unit may examine whether the first receiving unit has received the first information. Here, if the first receiving unit has received the first information, the judging unit may judge that the image is to be processed and output, and the output unit may perform the image modification indicated by the first information on the image, in addition to the image modification indicated by the second information.

According to this construction, the digital camera subjects the image not only to the image processing based on the second information, but also to the image processing based on the first information. Thus, more complicated image processing can be performed on the image.

Here, when the second receiving unit receives the second information, the judging unit may examine whether the first receiving unit has received the first information. Here, if the first receiving unit has received the first information, the judging unit may judge that the image is to be output without being processed.

According to this construction, the digital camera may be configured to receive the first information from the first transmission device, if the user makes a necessary payment. After this, the digital camera may be used to photograph the object, and then receive the second information indicating an image-blurring operation from the second transmission device.

In this way, the digital camera can be controlled not to perform an image-blurring operation on the image. In other words, the digital camera can be utilized for a system to purchase a right to perform photographing.

Here, when the second receiving unit receives the second information, the judging unit may examine whether the first receiving unit has received the first information. Here, if the first receiving unit has received the first information, the judging unit may judge that the image is not to be output.

According to this construction, if the first transmission device is provided at a place where photographing is prohibited, the image can be discarded. This can prevent photographing at a place where photography is prohibited.

Here, the first transmission device may be a gate which prestores the first information, and through which a user carrying the digital camera passes, and the second transmission device may be an IC tag which prestores the second information, and which is attached to, hung around, or provided near the object.

According to this construction, the IC tag is such a small computer system that the IC tag can be attached to, hung around, or provided near the object without hindering photographing of the object. Here, the user passes through the first transmission device which is a gate. If the gate is provided at an entrance and an exit of a specific region, the digital camera can perform image processing on an image obtained by photographing within the specific region.

Here, the digital camera may further comprise: a driving unit operable to, when detecting that a shutter release button included in the digital camera is pressed down, cause the imaging unit and the second receiving unit to operate concurrently.

According to this construction, when the user presses down the shutter release button of the digital camera to photograph the object, the digital camera can obtain information relating to image processing from the IC tag, concurrently with photographing the object. Thus, the digital camera can subject the image to corresponding image processing.

Here, the digital camera may have a function as a mobile telephone for performing radio communication.

According to this construction, the digital camera is a so-called camera-equipped mobile telephone. Since a camera-equipped mobile telephone is smaller than the digital camera, it is generally more difficult to prevent photographing with use of a camera-equipped mobile telephone in a place where photographing is prohibited. According to the present invention, however, the camera-equipped mobile telephone receives information relating to image processing from a transmission device, and can perform the image processing, without a need of storing a moving image, and regardless of the user's intention.

Here, the transmission device may be an IC tag that is attached to, hung around, or provided near the object, and that prestores the information which indicates image processing corresponding to the object, the judging unit may judge that the image is to be subjected to the image processing indicated by the information, and then to be output, and the output unit may subject the image to the image processing, and outputs the processed image to the memory.

According to this construction, the IC tag prestores the information relating to image processing corresponding to the object. Thus, the digital camera can perform corresponding image processing on the object, if the digital camera judges that image processing should be performed. The IC tag is so minute that the IC tag can be attached to, hung around, or provided near the object without hindering photographing of the object.

Here, the digital camera may further comprise: a driving unit operable to, when detecting that a shutter release button included in the digital camera is pressed down, cause the imaging unit and the receiving unit to operate concurrently.

According to this construction, when the user presses down the shutter release button of the digital camera to photograph the object, the digital camera can obtain information relating to image processing from the IC tag, concurrently with photographing the object. Thus, the digital camera can subject the image to corresponding image processing.

Here, the output unit may execute an image processing program corresponding to the image processing to make the image visually distinguishable.

According to this construction, the digital camera receives the information relating to the image processing, so as to perform an image-blurring operation or tone conversion on the image, or to modify the number of pixels of the image. In this way, the digital camera can perform image processing regardless of the user's intention. For example, the digital camera can perform an image-blurring operation or the like on an image obtained by inappropriate photographing at a place such as a museum, in order to protect a copyright.

Here, the receiving unit may receive the information which is character data showing an explanation about the object, the judging unit may judge that the image is to be subjected to the image processing which indicates addition of the character data to the image, and then output, and the output unit may subject the image to the image processing which indicates the addition of the character data to the image, and outputs the processed image to the memory.

According to this construction, an IC tag storing product information may be attached to each product at a shop, for example. Thus, the digital camera can obtain product information, as well as an image, by photographing each product. This can save the user efforts of investigating and inquiring product information, and may enhance the user's willingness to buy.

Here, the receiving unit may receive the information which is copyright information indicating a limitation on copying of the image, the judging unit may judge that the image is to be subjected to the image processing which indicates addition of the copyright information to the image, and then output, and the output unit may subject the image to the image processing which indicates the addition of the copyright information to the image, and outputs the processed image to the memory.

According to this construction, the image obtained using the digital camera can be prevented from being copied with no restriction.

Here, the receiving unit may receive the information which is a computer program to perform predetermined image modification, the judging unit may judge that the image is to be subjected to the image processing which indicates (i) execution of the computer program to perform the predetermined image modification on the image, or (ii) addition of the computer program to the image, and then output, and the output unit may subject the image to the image processing which indicates the predetermined image modification, or the addition of the computer program to the image, and outputs the processed image to the memory.

According to this construction, the digital camera can perform various types of image processing on the image in accordance with the program received from the IC tag, regardless of the user's intention. Alternatively, the digital camera may add the program to the image. In this way, various types of image processing can be performed on the image in accordance with the program, even when the image is displayed using a predetermined application program.

BRIEF DESCRIPTION OF THE DRAWINGS

FIG. 10 is a functional block diagram illustrating a construction of a digital camera 100a.

FIG. 13 is a flow chart illustrating image processing by the digital camera 100a.

FIG. 17 is a flow chart illustrating image processing by the digital camera 100b.

DETAILED DESCRIPTION OF THE INVENTION

The following describes a digital camera system 10 which is an embodiment of the present invention, with reference to the attached figures.

(Overview)

Figure 1:
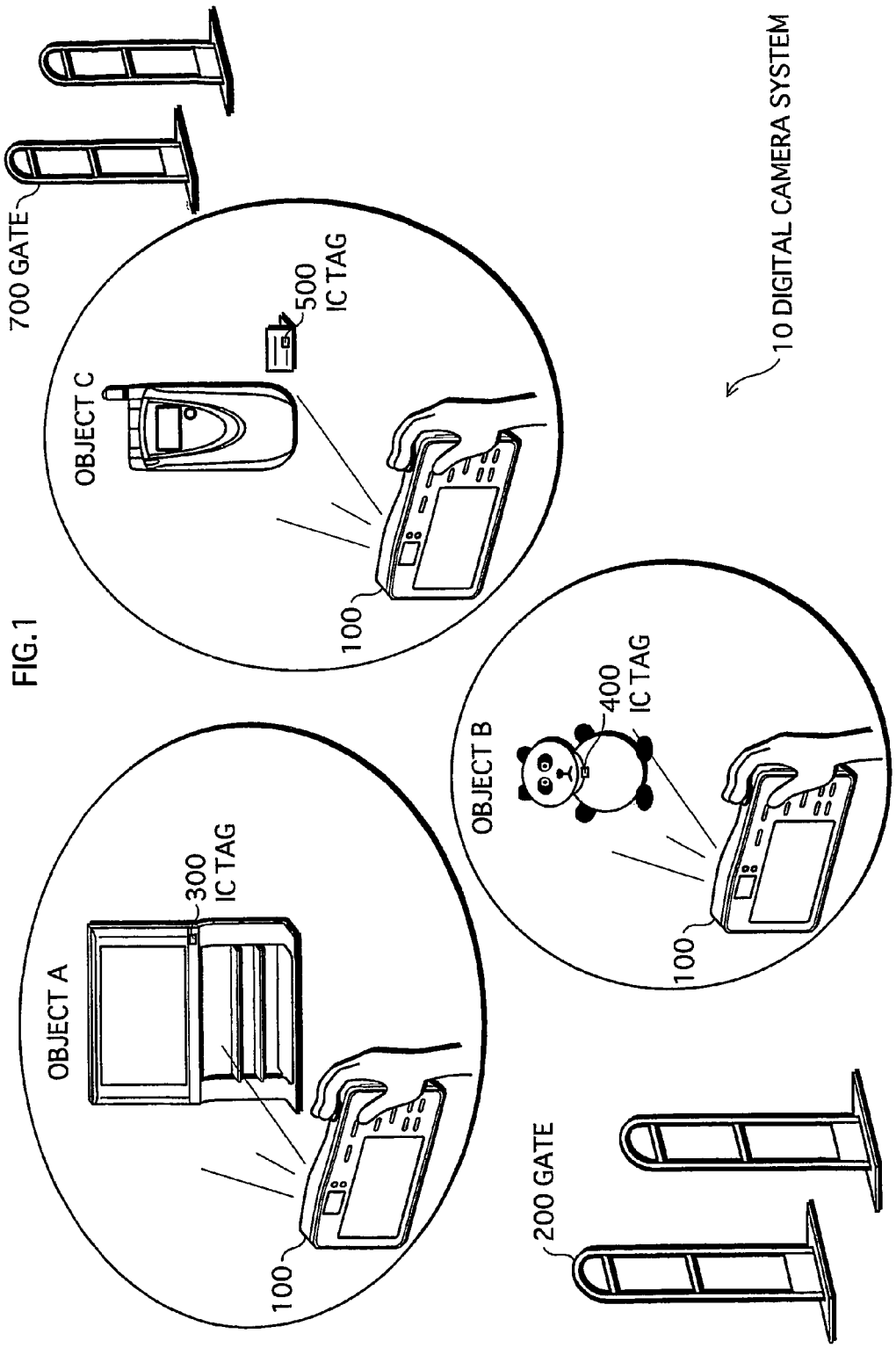
FIG. 1 illustrates constituents of a digital camera system 10.

FIG. 1 illustrates a construction of the digital camera system 10.

The digital camera system 10 includes a digital camera 100, a gate 200, an IC tag 300, an IC tag 400, an IC tag 500, a memory card 600 (not shown in FIG. 1), and a gate 700.

The digital camera 100 belongs to and used by a user. The gate 200 is provided at an entrance of an exhibition hall, as an example. The user carrying the digital camera 100 passes through the gate 200 to enter the exhibition hall.

An object A is a plasma television displayed at the exhibition hall. The IC tag 300 is attached to the plasma television. An object B is a pet robot displayed at the exhibition hall. The IC tag 400 is hung around a neck of the pet robot. An object C is a mobile telephone displayed at the exhibition hall. The IC tag 500 is provided near the mobile telephone.

The user photographs the objects A, B and C using the digital camera 100. The memory card 600 is a card-like memory for storing images, and is inserted in a memory card slot in the digital camera 100. The gate 700 is provided at an exit of the exhibition hall. The user carrying the digital camera 100 passes through the gate 700 to leave the exhibition hall.

(Construction)

The following part describes constituents of the digital camera system 10.

1. Digital Cameral 100

Figure 2:
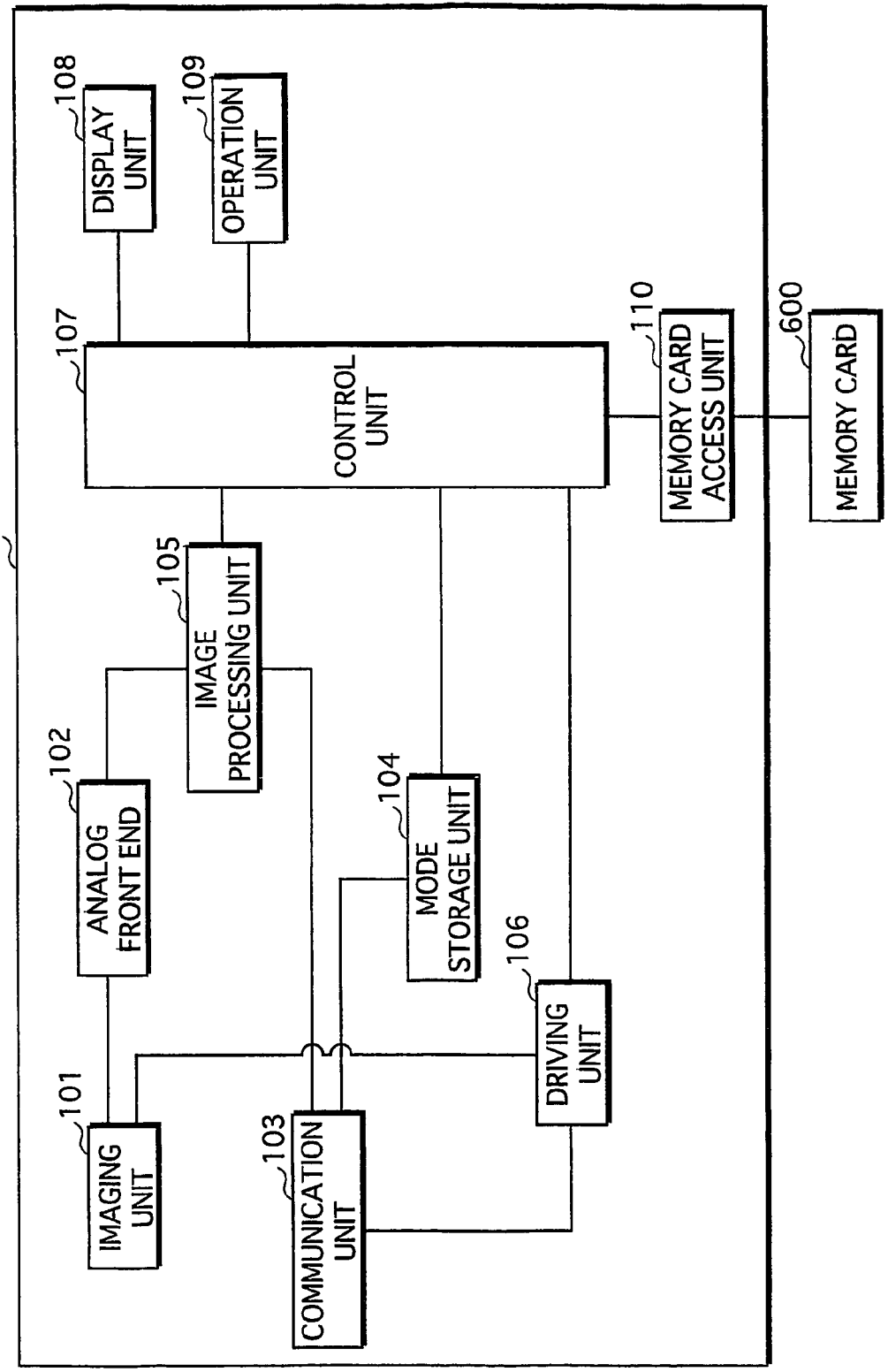
FIG. 2 is a functional block diagram illustrating a construction of a digital camera 100.

FIG. 2 is a functional block diagram illustrating a 15 construction of the digital camera 100. As shown in FIG. 2, the digital camera 100 is constituted by an imaging unit 101, an analog front end 102, a communication unit 103, a mode storage unit 104, an image processing unit 105, a driving unit 106, a control unit 107, a display unit 108, an operation unit 109, and a memory card access unit 110.

The digital camera 100 physically includes a lens, various buttons such as a shutter release button, a microprocessor, a ROM, a RAM, a display, the memory card slot for the memory card 600, and the like.

(1) Imaging Unit 101

The imaging unit 101 includes the lens and an imaging element.

The imaging element is formed in such a manner that a plurality of photoelectric converters are provided on a semiconductor substrate in a two-dimensional matrix. Each photoelectric converter has a color filter of one of a plurality of colors on its light-receiving surface. Each photoelectric converter converts an amount of light received through the lens from an object during a time period specified by a driving signal sent from the driving unit 106, into an electric charge. In the present embodiment, the number of the photoelectric converters corresponds to three million pixels.

The imaging element reads an electric charge generated by each photoelectric converter, and sends an image signal corresponding to the read electric charge to the analog front end 102. Alternatively, the imaging element may add electric charges together, to obtain a resulting electric charge, which are read from photoelectric converters having color filters of the same color in each portion of L rows and C columns ($6 \leq L$, $6 \leq C$, and L and C are even natural numbers) Here, the portion is formed by partitioning the matrix of the photoelectric converters. In this case, the imaging element reads the resulting electric charge for each portion, and sends an image signal corresponding to the resulting electric charge to the analog front end 102.

(2) Analog Front End 102

The analog front end 102 performs the correlated double sampling (CDS) and the auto gain control (AGC) on the image signal received from the imaging unit 101, and then converts the image signal into a digital image signal. The analog front end 102 sends the digital image signal to the image processing unit 105.

(3) Communication Unit 103

The communication unit 103 includes an antenna. The communication unit 103 communicates with the gates 200 and 700, and the IC tags 300, 400 and 500.

Specifically speaking, the communication unit 103 receives mode information transmitted from the gate 200, and sends the received mode information to the mode storage unit 104. Similarly, the communication unit 103 receives mode information transmitted from the gate 700, and sends the received mode information to the mode storage unit 104. The mode information is described later.

Also, the communication unit 103 transmits/receives a radio wave to/from the IC tag 300 attached to the object A, concurrently with photographing of the object A performed by the imaging unit 101. In more detail, during a time period specified by a driving signal sent from the driving unit 106, the communication unit 103 transmits a radio wave to the IC tag 300, and then receives a radio wave from the IC tag 300. The communication unit 103 extracts image processing information from the radio wave received from the IC tag 300, and sends the extracted image processing information to the image processing unit 105.

In the same manner, the communication unit 103 transmits/receives a radio wave to/from the IC tag 400 hung around the object B, concurrently with photographing of the object B performed by the imaging unit 101. The communication unit 103 extracts image processing information from a radio wave received from the IC tag 400, and sends the extracted image processing information to the image processing unit 105.

In the same manner, the communication unit 103 transmits/receives a radio wave to/from the IC tag 500 provided near the object C, concurrently with photographing of the object C performed by the imaging unit 101. The communication unit 103 extracts image processing information from a radio wave received from the IC tag 500, and sends the extracted image processing information to the image processing unit 105. Here, image processing information can indicate a plurality of kinds of image processing, one of which is image modification. In the present invention, image modification indicates a process to make an image visually distinguishable.

(4) Mode Storage Unit 104

The mode storage unit 104 stores mode information. Here, mode information is related to the number of pixels, and specifically speaking, indicates one of a selection mode and a fixed mode/100 megapixels.

When the mode information stored in the mode storage unit 104 indicates the selection mode, the operation unit 109 receives the user's operation selecting the number of pixels. The control unit 107 writes image data received from the image processing unit 105 into the memory card 600 through the memory card access unit 110, according to the number of pixels selected by the user.

When the mode information indicates the fixed mode/100 megapixels, the operation unit 109 does not accept an input of the number of pixels selected by the user's operation. The control unit 107 writes image data received from the image processing unit 105 into the memory card 600 through the memory card access unit 110, according to the predetermined 100 megapixels. In other words, when the mode information indicates the fixed mode/100 megapixels, image data is stored in the memory card 600 according to 100 megapixels, regardless of the user's intention.

Under a normal condition, the mode storage unit 104 stores mode information indicating the selection mode. When the user carrying the digital camera 100 passes through the gate 200 to enter the exhibition hall, the mode storage unit 104 receives mode information indicating the fixed mode/100 megapixels from the gate 200 through the communication unit 103. The mode storage unit 104 replaces the stored mode information indicating the selection mode, with the currently received mode information indicating the fixed mode/100 megapixels. Furthermore, when the user carrying the digital camera 100 passes through the gate 700 to leave the exhibition hall, the mode storage unit 104 receives mode information indicating the selection mode from the gate 700 through the communication unit 103. The mode storage unit 104 replaces the stored mode information indicating the fixed mode/100 megapixels, with the currently received mode information indicating the selection mode.

Figure 3A:
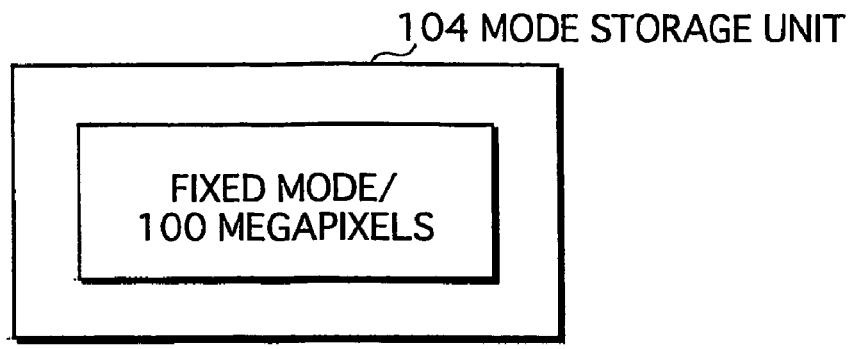
FIG. 3A illustrates mode information that is stored in a mode storage unit 104 of the digital camera 100 after a user with the digital camera 100 has passed through a gate 200.
Figure 3B:
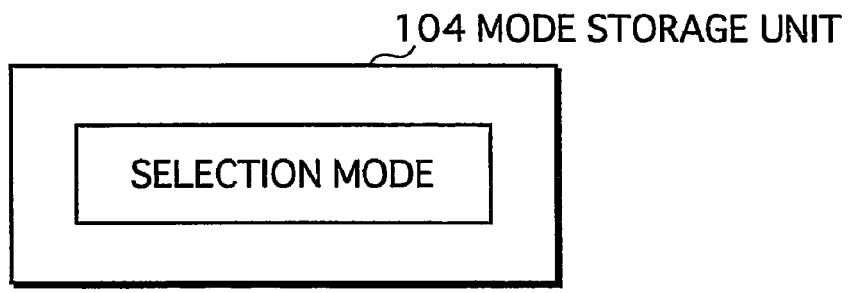
FIG. 3B illustrates mode information that is stored in the mode storage unit 104 of the digital camera 100 before the user with the digital camera 100 passes through the gate 200, or when the user with the digital camera 100 has passed through a gate 700.

Which is to say, the mode storage unit 104 stores mode information indicating the fixed mode/100 megapixels as shown in FIG. 3A, when the user with the digital camera 100 stays within the exhibition hall limited by the gate 200 and the gate 700. The mode storage unit 104 stores mode information indicating the selection mode as shown in FIG. 3B, when the user with the digital camera 100 is outside the exhibition hall.

Figure 3C:
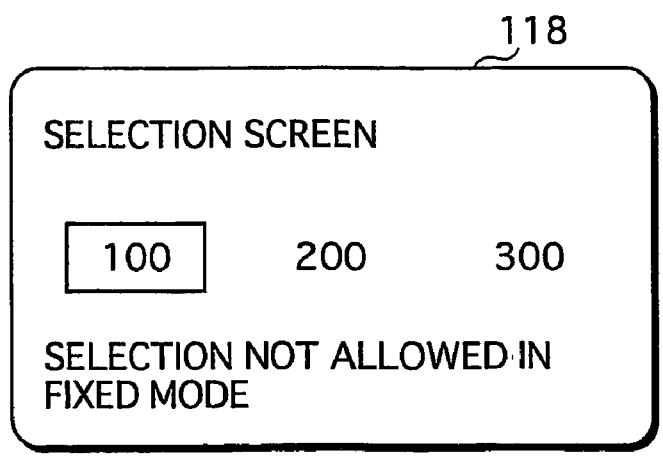
FIG. 3C illustrates a selection screen 118 displayed on a display unit 108 of the digital camera 100, when the mode storage unit 104 stores mode information indicating a fixed mode/100 megapixels.

FIG. 3C illustrates a selection screen 118 displayed on the display unit 108, if the mode storage unit 104 stores mode information indicating the fixed mode/100 megapixels. The selection screen 118 shows three numbers 100, 200 and 300 each indicating the number of pixels. In FIG. 3C, 100 megapixels is selected. Furthermore, a message saying "SELECTION NOT ALLOWED IN FIXED MODE" is displayed at the bottom of the selection screen 118.

(5) Image Processing Unit 105

The image processing unit 105 includes a microprocessor, a ROM, a RAM, and the like. The image processing unit 105 receives a digital image signal from the analog front end 102, and image processing information from the communication unit 103. The image processing unit 105 performs image processing on the digital image signal in accordance with the received image processing information, to generate image data. This operation is described in the following in detail.

Figure 4A:
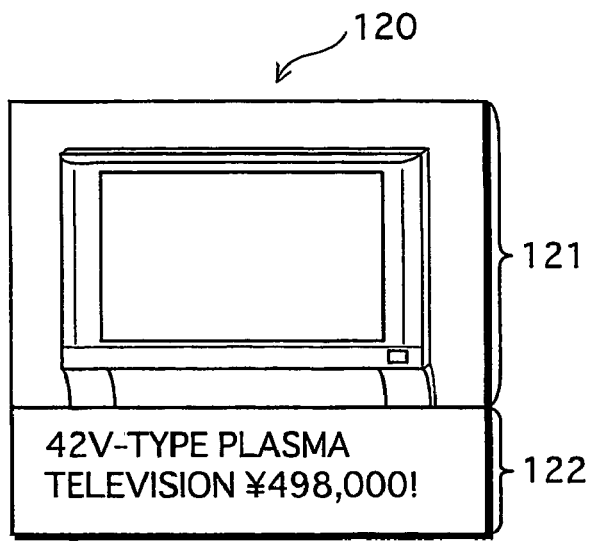
FIG. 4A illustrates image data 120 that is generated by subjecting an image of an object A to image processing in accordance with image processing information received from an IC tag 300.

The image processing unit 105 receives a digital image signal 121 (shown in FIG. 4A) corresponding to the object A from the analog front end 102, and image processing information 122 (shown in FIG. 4A) corresponding to the object A from the communication unit 103. The image processing information 122, which is transmitted from the IC tag 300 attached to the object A, is character data showing an explanation about the object A. The image processing unit 105 then performs image processing on the digital image signal 121, to generate image data 120 shown in FIG. 4A. To be specific, the image processing unit 105 adds the character data to the digital image signal 121. Here, the addition of the character data is realized using a user field defined by the Exchangeable image file format (Exif), which is an image format for use in digital cameras, and a comment segment defined by the Joint Photographic Experts Group (JPEG) format. The image processing unit 105 sends the generated image data 120 to the control unit 107.

Figure 4B:
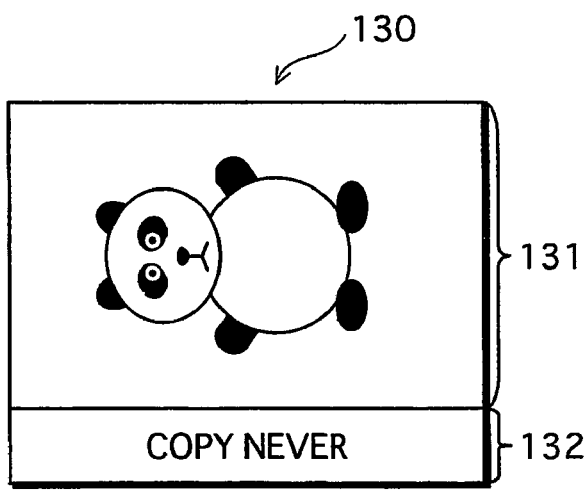
FIG. 4B illustrates image data 130 that is generated by subjecting an image of an object B to image processing in accordance with image processing information received from an IC tag 400.

Furthermore, the image processing unit 105 receives a digital image signal 131 (shown in FIG. 4B) corresponding to the object B from the analog front end 102, and image processing information 132 (shown in FIG. 4B) corresponding to the object B from the communication unit 103. The image processing information 132, which is transmitted from the IC tag 400 hung around the object B, is copyright information about the object B. The image processing unit 105 performs image processing on the digital image signal 131, to generate image data 130 shown in FIG. 4B. To be specific, the image processing unit 105 adds the copyright information to the digital image signal 131. The image processing unit 105 sends the generated image data 130 to the control unit 107. Here, the addition of the copyright information is realized using a user field defined by the Exif and a comment segment defined by the JPEG format.

Figure 4C:
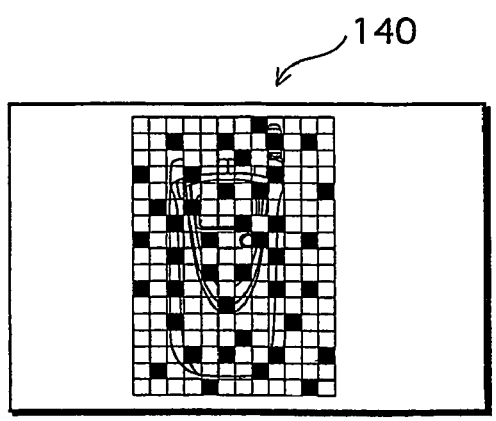
FIG. 4C illustrates image data 140 that is generated by subjecting an image of an object C to image processing in accordance with image processing information received from an IC tag 500.

Also, the image processing unit 105 receives a digital image signal corresponding to the object C from the analog front end 102, and image processing information corresponding to the object C from the communication unit 103. The image processing information, which is transmitted from the IC tag 500 provided near the object C, is a program to perform an image-blurring operation. The image processing unit 105 reads and executes the program, to perform an image-blurring operation on the digital image signal. Thus, the image processing unit 105 generates image data 140 shown in FIG. 4C. The image processing unit 105 sends the generated image data 140 to the control unit 107. Here, a technique to perform an image-blurring operation is publicly known, and therefore not explained here.

(6) Driving Unit 106

The driving unit 106 generates an appropriate driving signal according to an operation received by the operation unit 109, and sends the generated driving signal to an appropriate constituent of the digital camera 100.

For example, when receiving, from the control unit 107, a control signal indicating that the shutter release button included in the operation unit 109 is pressed down, the driving unit 106 generates a first signal and a second signal. The driving unit 106 sends the first signal to the imaging unit 101, and the second signal to the communication unit 103. The imaging unit 101 operates in accordance with the first signal, and the communication unit 103 operates in accordance with the second signal. This enables the image processing unit 105 to interrelate a digital image signal generated by photographing an object and image processing information transmitted from an IC tag attached to, hung around, or provided near the object.

(7) Control Unit 107

The control unit 107 specifically includes a microprocessor, a ROM, a RAM, and the like. The control unit 107 controls the digital camera 100 in such a manner that the microprocessor executes a computer program stored in the ROM or RAM.

The following part, as an example, describes an operation of the control unit 107 when the shutter release button included in the operation unit 109 is pressed down.

When receiving an operation signal indicating that the shutter release button is pressed down from the operation unit 109, the control unit 107 generates a control signal indicating that the shutter button is pressed down, and sends the generated control signal to the driving unit 106.

In response to the control signal, for example, the object A is photographed by the driving unit 106, the imaging unit 101, and the analog front end 102. Furthermore, the image data 120 (shown in FIG. 4A) corresponding to the object A is generated by the driving unit 106, the communication unit 103, and the image processing unit 105.

The control unit 107 receives the image data 120 from the image processing unit 105. The control unit 107 reads mode information stored in the mode storage unit 104. Here, the read mode information indicates the fixed mode/100 megapixels as shown in FIG. 3A.

The control unit 107 performs a necessary processing on the image data 120 received from the image processing unit 105, so that the image data 120 has 100 megapixels. The control unit 107 writes the processed image data 120 into the memory card 600 through the memory card access unit 110.

Similarly, the control unit 107 receives the image data 130 generated based on photographing of the object B, from the image processing unit 105. The control unit 107 performs a necessary processing on the image data 130, so that the image data 130 has 100 megapixels. The control unit 107 then writes the processed image data 130 into the memory card 600 through the memory card access unit 110.

Also, the control unit 107 receives the image data 140 generated based on photographing of the object C, from the image processing unit 105. The control unit 107 performs a necessary processing on the image data 140, so that the image data 140 has 100 megapixels. The control unit 107 then writes the processed image data 140 into the memory card 600 through the memory card access unit 110.

(8) Display Unit 108

The display unit 108 includes a display, and shows an operation screen sent from the control unit 107 on the display. The operation screen is, as an example, the selection screen 118 shown in FIG. 3C.

Furthermore, the display unit 108 shows the image data 120, 130 and 140 stored in the memory card 600 on the display.

(9) Operation Unit 109

The operation unit 109 includes a plurality of buttons such as the shutter release button. When the user presses down any of the buttons, the operation unit 109 generates an operation signal corresponding to the pressed button, and sends the generated operation signal to the control unit 107.

(10) Memory Card Access Unit 110

The memory card access unit 110 specifically includes a memory card slot, and the like. While the memory card 600 is inserted into the memory card slot, the memory card access unit 110 writes the image data 120, 130 and 140 sent from the control unit 107, into the memory card 600. In addition, the memory card access unit 110 reads the image data 120, 130 and 140 from the memory card 600, and sends the read image data to the display unit 108 through the control unit 107, in order to have the display unit 108 display the image data 120, 130 and 140 on the display.

2. Gate 200

Figure 5:
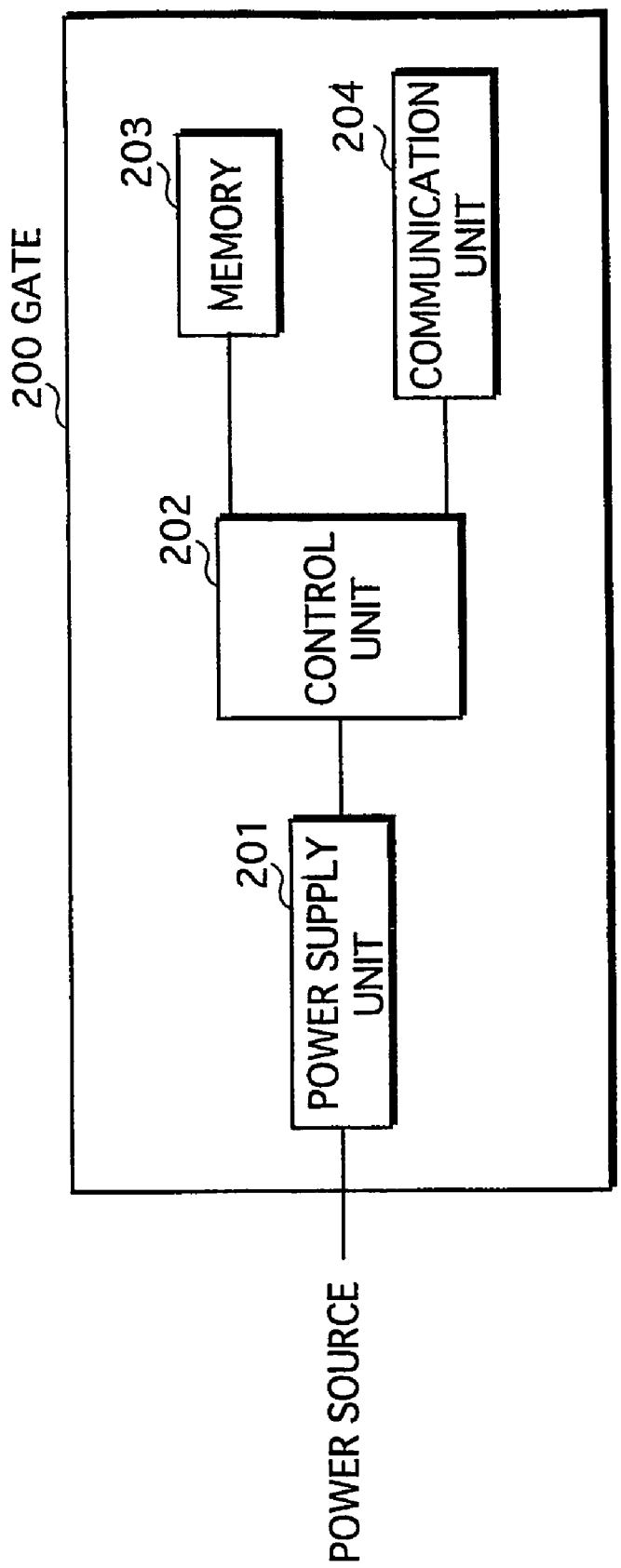
FIG. 5 is a functional block diagram illustrating a construction of the gate 200.

The gate 200 is provided at the entrance of the exhibition hall as shown in FIG. 1. The user carrying the digital camera 100 passes through the gate 200 to enter the exhibition hall. It should be noted that a shape of the gate 200 shown in FIG. 1 only serves as an example, and can be modified as long as the gate 200 is a computer system including a microprocessor, a ROM, a RAM, and the like, and constituted by a power supply unit 201, a control unit 202, a memory 203, and a communication unit 204, as shown in FIG. 5.

(1) Power Supply Unit 201

The power supply unit 201 is supplied with power by an external power source connected thereto, and supplies power to other constituents of the gate 200.

(2) Control Unit 202

The control unit 202 specifically includes a microprocessor, a ROM, a RAM, and the like. The control unit 202 controls the gate 200 in such a manner that the microprocessor executes a computer program stored in the ROM or RAM.

The control unit 202 is supplied with power by the power supply unit 201. The control unit 202 reads information from the memory 203, and sends the read information to the communication unit 204.

(3) Memory 203

The memory 203 stores mode information indicating the fixed mode/100 megapixels.

(4) Communication Unit 204

The communication unit 204 includes an antenna. The communication unit 204 receives the mode information indicating the fixed mode/100 megapixels from the control unit 202, and transmits the received mode information through a radio wave.

The mode information transmitted from the communication unit 204 is received by the antenna included in the communication unit 103 of the digital camera 100. Here, before the user with the digital camera 100 passes through the gate 200, the digital camera 100 stores mode information indicating the selection mode. If the user passes through the gate 200 taking the digital camera 100 with him/her, the digital camera 100 receives the mode information indicating the fixed mode/100 megapixels from the communication unit 204. Thus, the digital camera 100 replaces the mode information indicating the selection mode, with the currently received mode information indicating the fixed mode/100 megapixels.

3. IC Tag 300

The IC tag 300 is attached to the object A as shown in FIG. 1. The IC tag 300 does not include a battery. The IC tag 300 is a noncontact data carrier, and communicates with the digital camera 100 in the following manner. The IC tag 300 receives an activating signal from the digital camera 100, and generates an electromotive force by resonance.

Figure 6:
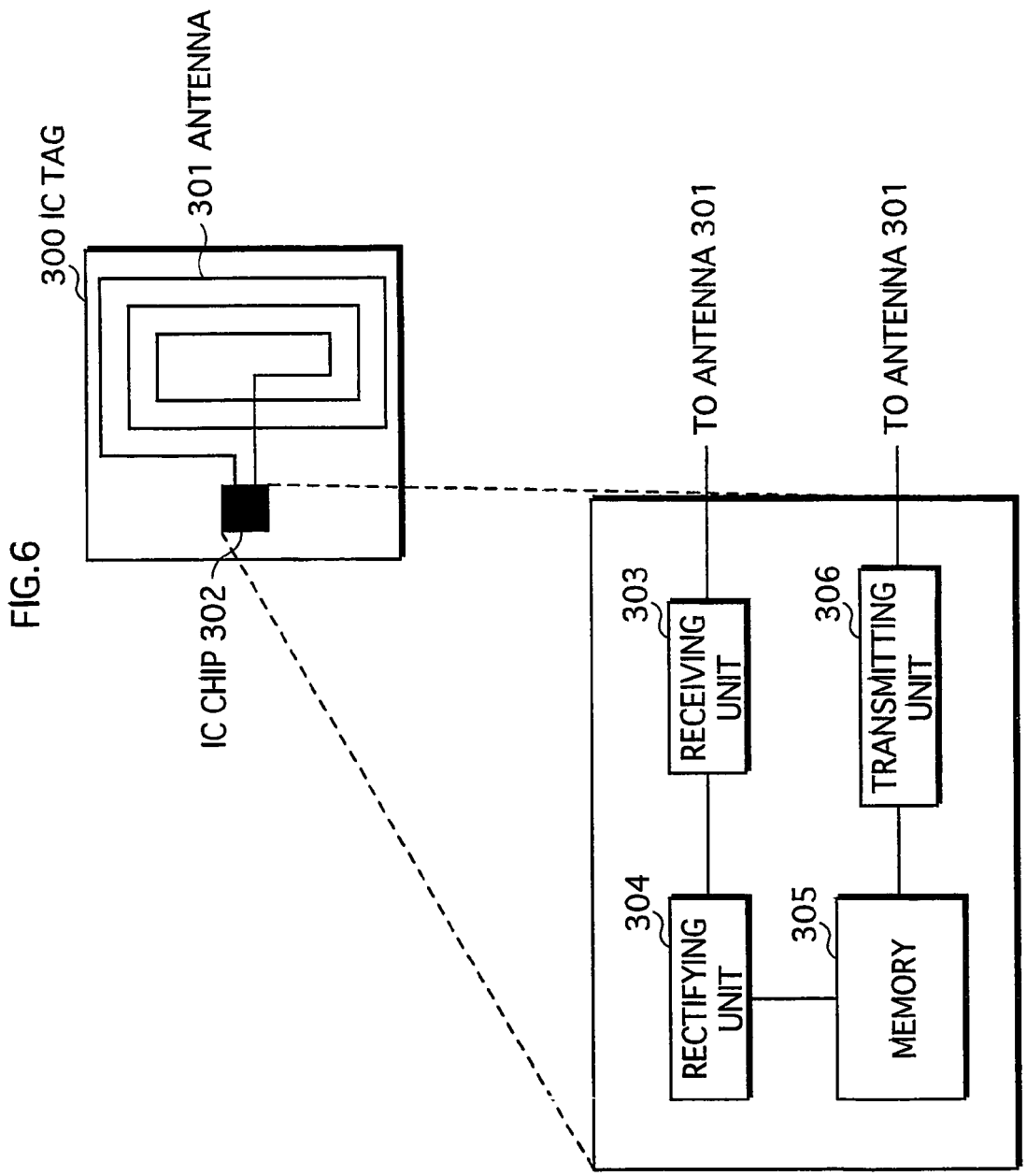
FIG. 6 is a functional block diagram illustrating a construction of the IC tag 300.

FIG. 6 illustrates a construction of the IC tag 300. As shown in FIG. 6, the IC tag 300 includes an antenna 301 and an IC chip 302.

(1) Antenna 301

The antenna 301 receives an activating signal from the communication unit 103 in the digital camera 100, and sends the received activating signal to a receiving unit 303 in the IC chip 302. Furthermore, the antenna 301 receives a transmission signal from a transmitting unit 306 in the IC chip 302, and transmits the received transmission signal to the digital camera 100 through a radio wave, an electromagnetic wave, a microwave or the like having a predetermined frequency.

(2) IC Chip 302

The IC chip 302 is constituted by the receiving unit 303, a rectifying unit 304, a memory 305, and the transmitting unit 306 as shown in FIG. 6. The IC chip 302 is a minute computer system specifically including a CPU, a masked ROM, an EEPROM, a RAM, and the like.

(a) Receiving Unit 303

The receiving unit 303 receives the activating signal from the digital camera 100 through the antenna 301, and sends the received activating signal to the rectifying unit 304.

(b) Rectifying Unit 304

The rectifying unit 304 receives the activating signal from the receiving unit 303, and converts the activating signal into energy by resonance, to generate an electromotive force. Thus, a circuit in the IC chip 302 is activated, so that the IC chip 302 starts to communicate with the digital camera 100.

(c) Memory 305

The memory 305 is realized using a RAM. Here, the memory 305 prestores the image processing information 122 corresponding to the object A. The image processing information 122 is product information for the object A, in more detail, character data showing "42V-type plasma television ¥498,000!".

(d) Transmitting Unit 306

The transmitting unit 306 reads the image processing information 122 showing "42V-type plasma television ¥498,000!" stored in the memory 305, when supplied with power by the rectifying unit 304. The transmitting unit 306 converts the read image processing information 122 into a transmission signal, and transmits the transmission signal to the digital camera 100 through the antenna 301.

4. IC Tag 400

The IC tag 400 is hung around the object B as shown in FIG. 1. As well as the IC tag 300, the IC tag 400 is a noncontact data carrier, and does not include a battery.

The IC tag 400 includes an antenna and an IC chip, and the IC chip is constituted by a receiving unit, a rectifying unit, a memory, and a transmitting unit. A construction of the IC tag 400 is the same as that of the IC tag 300 shown in FIG. 6, and therefore not shown.

The antenna in the IC tag 400 receives an activating signal from the communication unit 103 in the digital camera 100, and sends the received activating signal to the receiving unit in the IC chip. Furthermore, the antenna receives a transmission signal from the transmitting unit in the IC chip, and transmits the received transmission signal to the digital camera 100 through a radio wave, an electromagnetic wave, a microwave or the like having a predetermined frequency.

The IC chip is a minute computer system specifically including a CPU, a masked ROM, an EEPROM, a RAM, and the like.

The receiving unit receives the activating signal from the digital camera 100 through the antenna, and sends the received activating signal to the rectifying unit.

The rectifying unit receives the activating signal from the receiving unit, and converts the activating signal into energy by resonance, to generate an electromotive force. Thus, a circuit in the IC chip is activated, so that the IC chip starts to communicate with the digital camera 100.

The memory is realized using a RAM. Here, the memory prestores the image processing information 132 corresponding to the object B. The image processing information 132 is copyright information for the object B, in more detail, character data showing "COPY NEVER". Here, the image processing information 132 may be a flag indicating prohibition of copying.

The transmitting unit reads the image processing information 132 showing "COPY NEVER" stored in the memory, when supplied with power by the rectifying unit. The transmitting unit converts the read image processing information 132 to a transmission signal, and transmits the transmission signal to the digital camera 100 through the antenna.

5. IC Tag 500

The IC tag 500 is provided near the object C as shown in FIG. 1. As well as the IC tags 300 and 400, the IC tag 500 is a noncontact data carrier, and does not include a battery.

The IC tag 500 includes an antenna and an IC chip. The IC chip is constituted by a receiving unit, a rectifying unit, a memory, and a transmitting unit. A construction of the IC tag 500 is the same as that of the IC tag 300 shown in FIG. 6, and therefore not shown.

The antenna receives an activating signal from the communication unit 103 in the digital camera 100, and sends the received activating signal to the receiving unit in the IC chip. Furthermore, the antenna receives a transmission signal from the transmitting unit in the IC chip, and transmits the received transmission signal to the digital camera 100 through a radio wave, an electromagnetic wave, a microwave or the like having a predetermined frequency.

The IC chip is a minute computer system specifically including a CPU, a masked ROM, an EEPROM, a RAM and the like.

The receiving unit receives the activating signal from the digital camera 100 through the antenna, and sends the received activating signal to the rectifying unit.

The rectifying unit receives the activating signal from the receiving unit, and converts the activating signal into energy by resonance, to generate an electromotive force. Thus, a circuit in the IC chip is activated, so that the IC chip starts to communicate with the digital camera 100.

The memory is realized using a RAM. Here, the memory prestores the image processing information corresponding to the object C. The image processing information is a program to perform an image-blurring operation.

The transmitting unit reads the program stored in the memory, when supplied with power by the rectifying unit. The transmitting unit converts the read program into a transmission signal, and transmits the transmission signal to the digital camera 100 through the antenna.

6. Memory Card 600

The memory card 600 stores images, and is inserted into the memory card slot in the digital camera 100, to be used. The memory card 600 is constituted by a control unit and a storage unit.

The control unit receives the image data 120, 130 and 140 from the memory card access unit 110 in the digital camera 100, and writes the received image data 120, 130, 140 into the storage unit.

The storage unit is realized using a flash memory. The storage unit stores the image data 120, 130 and 140 received from the control unit.

7. Gate 700

The gate 700 is provided at the exit of the exhibition hall as shown in FIG. 1. The user carrying the digital camera 100 passes through the gate 700 to leave the exhibition hall.

A shape of the gate 700 shown in FIG. 1 only serves as an example, and can be modified, similarly to the shape of the gate 200. The gate 700 is a computer system including a microprocessor, a ROM, a RAM, and the like.

The gate 700 is constituted by a power supply unit connected to an external power source, a control unit that controls the gate 700, a memory storing mode information, and a communication unit that communicates with the digital camera 100. A construction of the gate 700 is the same as that of the gate 200 shown in FIG. 5, and therefore not shown.

The memory in the gate 700 stores mode information indicating the selection mode. The memory transmits the mode information to the digital camera 100 through the communication unit on a radio wave. The transmitted mode information is received by the antenna included in the communication unit 103 of the digital camera 100.

Here, before the user with the digital camera 100 passes through the gate 700, the digital camera 100 stores the mode information indicating the fixed mode/100 megapixels. When the user passes through the gate 700, the digital camera 100 receives the mode information transmitted from the communication unit in the gate 700. Thus, the digital camera 100 replaces the mode information indicating the fixed mode/100 megapixels, with the currently received mode information indicating the selection mode.

(Operation)

Figure 7:
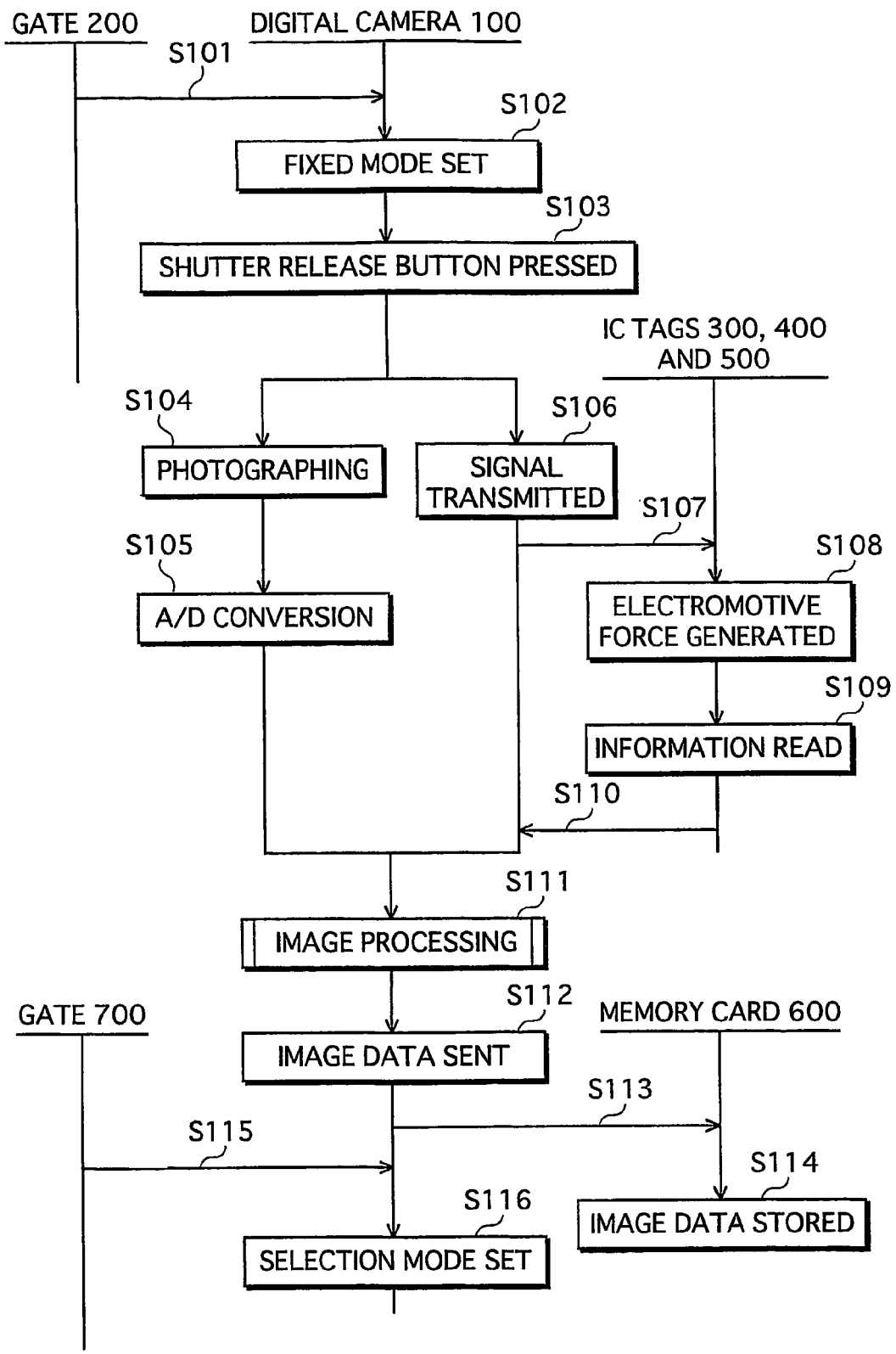
FIG. 7 is a flow chart illustrating an operation of the digital camera system 10.
Figure 8:
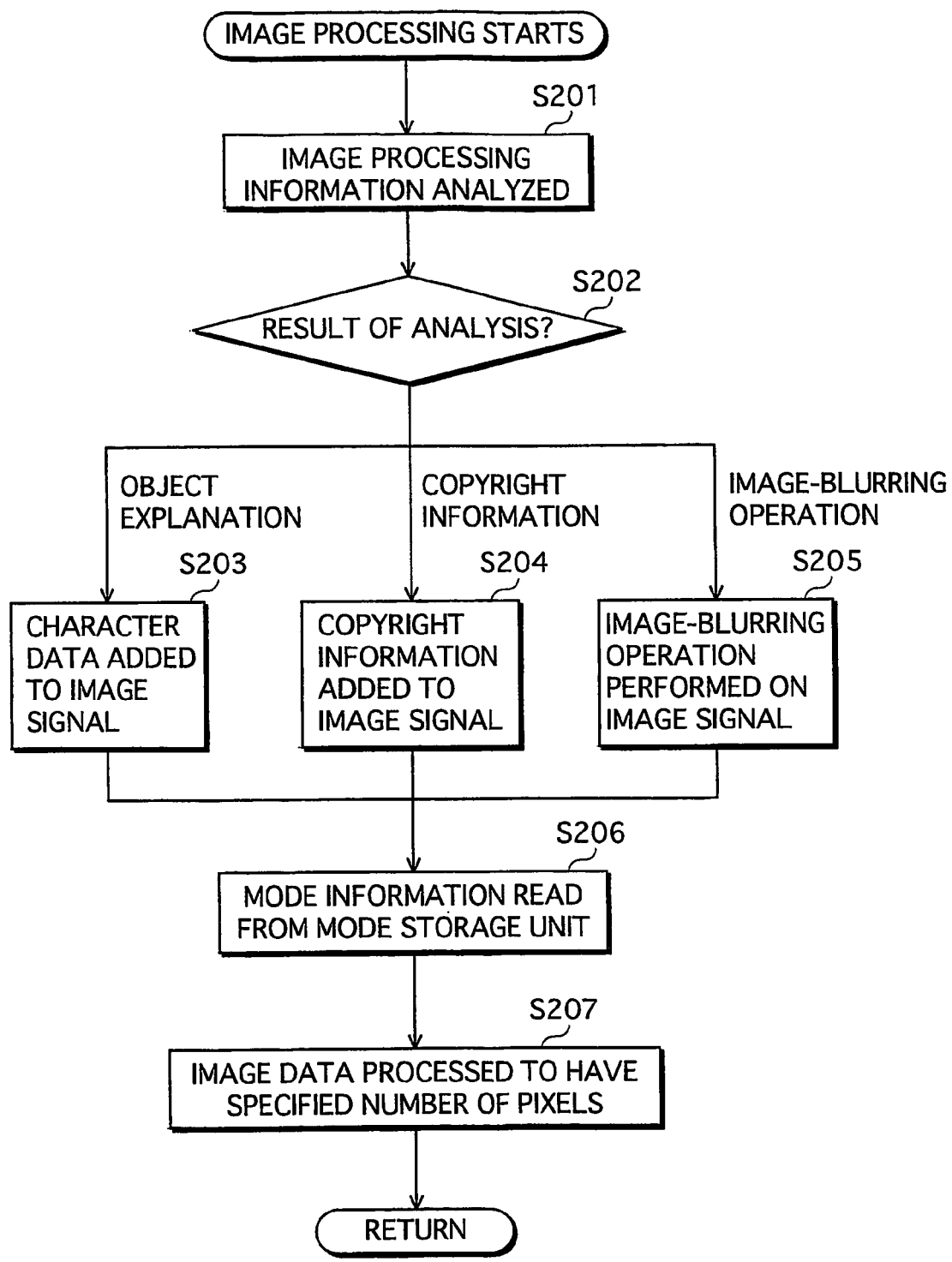
FIG. 8 is a flow chart illustrating image processing by the digital camera 100.

The following part describes an operation of the digital camera system 10, with reference to flow charts shown in FIGS. 7 and 8.

1. Overview

FIG. 7 is a flow chart illustrating an operation of the digital camera system 10.

The gate 200 transmits mode information indicating the fixed mode/100 megapixels. The communication unit 103 of the digital camera 100 receives the mode information from the gate 200 (step S101).

The communication unit 103 of the digital camera 100 sends the received mode information indicating the fixed mode/100 megapixels to the mode storage unit 104. The mode storage unit 104 then replaces mode information indicating the selection mode, with the currently received mode information indicating the fixed mode/100 megapixels. Thus, the fixed mode is set (step S102).

When the user presses down the shutter release button included in the operation unit 109 (step S103), the operation unit 109 generates an operation signal corresponding to the pressing, and sends the generated operation signal to the control unit 107. The control unit 107 converts the operation signal into a control signal, and sends the control signal to the driving unit 106. When receiving the control signal, the driving unit 106 generates a first signal and a second signal. The driving unit 106 sends the first signal to the imaging unit 101, and the second signal to the communication unit 103.

In accordance with the first signal, the imaging unit 101 photographs an object (step S104), generates an image signal, and sends the image signal to the analog front end 102. When receiving the image signal from the imaging unit 101, the analog front end 102 analog-to-digital (A/D) converts the image signal (step S105), to generate a digital image signal. The analog front end 102 sends the digital image signal to the image processing unit 105.

In accordance with the second signal, on the other hand, the communication unit 103 transmits an activating signal to an IC tag (step S106). Here, the IC tag corresponds to the object photographed by the imaging unit 101 in the step S104. Which is to say, if the imaging unit 101 photographs the object A in the step S104, the communication unit 103 transmits the activating signal to the IC tag 300. If the imaging unit 101 photographs the object B, the communication unit 103 transmits the activating signal to the IC tag 400. If the imaging unit 101 photographs the object C, the communication unit 103 transmits the activating signal to the IC tag 500.

An antenna included in the IC tag receives the activating signal from the communication unit 103 of the digital camera 100 (step S107), and sends the received activating signal to an IC chip included in the IC tag. A rectifying unit in the IC chip generates an electromotive force by resonance (step S108), to supply power to other constituents of the IC chip.

A transmitting unit in the IC chip reads image processing information stored in a memory in the IC chip (step S109), and converts the read image processing information into a transmission signal. The IC tag transmits the transmission signal to the digital camera 100. The communication unit 103 in the digital camera 100 receives the transmission signal (step S110). The communication unit 103 sends the received transmission signal, which indicates the image processing information, to the image processing unit 105.

The image processing unit 105 subjects the digital image signal received from the analog front end 102 to image processing based on the image processing information received from the communication unit 103. Thus, the image processing unit 105 generates image data, and sends the image data to the control unit 107. The control unit 107 conducts image processing, according to the mode information read from the mode storage unit 104, on the received image data (step S111). The control unit 107 sends the image data to the memory card access unit 110 (step S112).

The memory card 600 receives the image data sent from the memory card access unit 110 (step S113), and stores the image data (step S114).

The communication unit 103 of the digital camera 100 receives mode information indicating the selection mode transmitted from the gate 700 (step S115).

The communication unit 103 sends the received mode information to the mode storage unit 104. The mode storage unit 104 replaces the mode information indicating the fixed mode/100 megapixels, with the currently received mode information indicating the selection mode. Thus, the selection mode is set (step S116).

2. Image Processing

FIG. 8 is a flow chart illustrating image processing performed by the digital camera 100. The following part describes the step S111 of the flow chart shown in FIG. 7 in detail.

The image processing unit 105 analyzes the image processing information received from the communication unit 103 (step S201).

When the image processing information indicates an explanation about the object (OBJECT EXPLANATION: step S202), the image processing unit 105 generates the image data by adding character data which shows the explanation about the object, to the digital image signal (step S203). The image processing unit 105 sends the image data to the control unit 107. The operation proceeds to a step S206.

When the image processing information indicates copyright information regarding the object (COPYRIGHT INFORMATION: step S202), the image processing unit 105 generates the image data by adding the copyright information to the digital image signal (step S204). The image processing unit 105 sends the image data to the control unit 107. The operation proceeds to a step S206.

When the image processing information is a program to perform an image-blurring operation (IMAGE-BLURRING OPERATION: step S202), the image processing unit 105 generates the image data by performing an image-blurring operation on the digital image signal in accordance with the program (step S205). The image processing unit 105 sends the image data to the control unit 107.

The control unit 107 reads the mode information stored in the mode storage unit 104 (step S206). The control unit 107 performs a necessary processing on the image data received from the image processing unit 105, so as that the image data has the number of pixels indicated by the read mode information (step S207). After this, the operation proceeds to the step S112, and continues.

Modification Examples

The following part concretely describes modification examples of the digital camera system 10.

1. Digital Camera System 20

Figure 9:
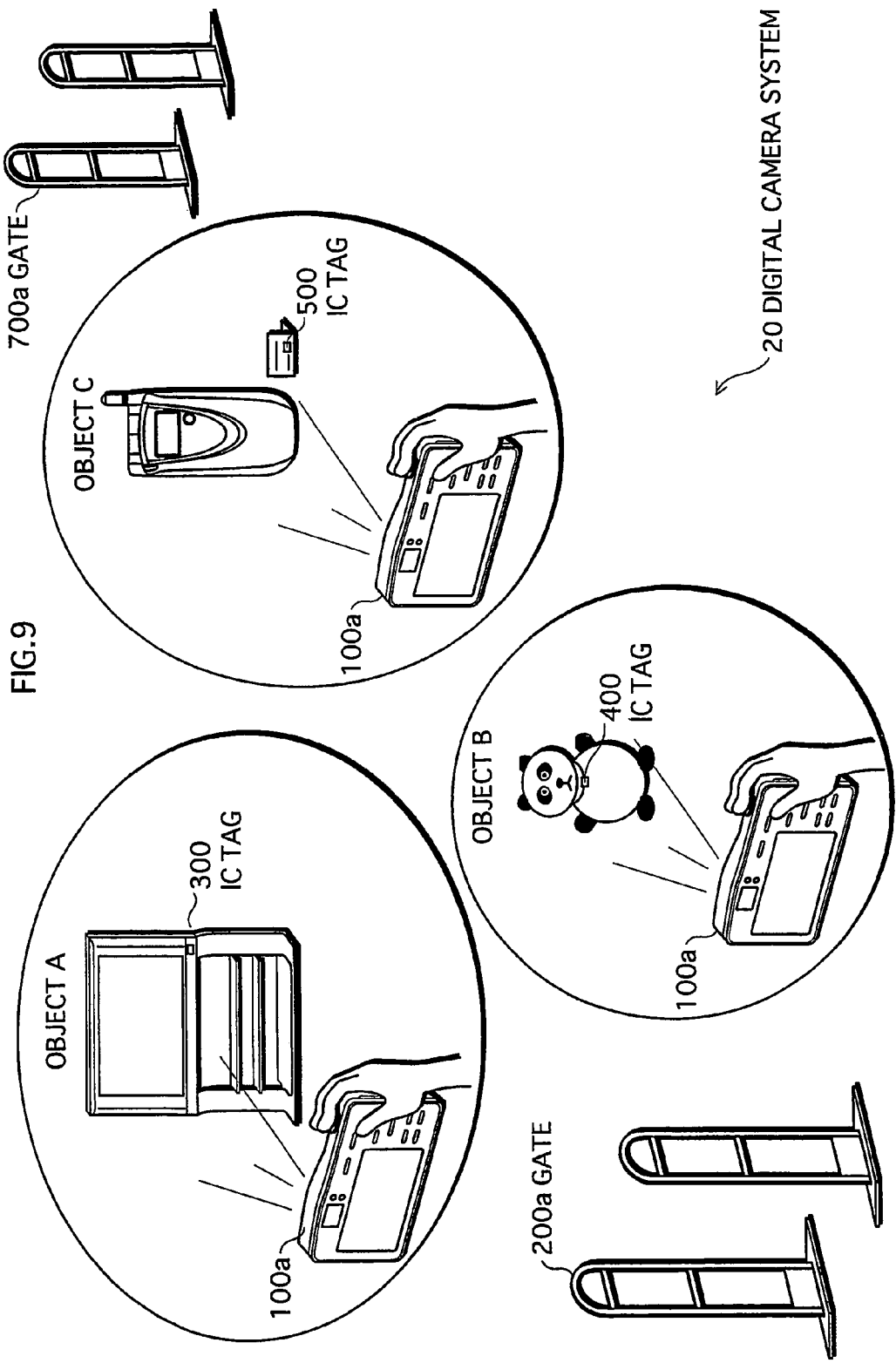
FIG. 9 illustrates constituents of a digital camera system 20.

FIG. 9 illustrates a construction of a digital camera system 20. As shown in FIG. 9, the digital camera system 20 includes a digital camera 100a, a gate 200a, the IC tag 300, the IC tag 400, the IC tag 500, the memory card 600 (not shown in FIG. 9), and a gate 700a.

The digital camera system 20 is the same as the digital camera system 10, except for the digital camera 100a, the gate 200a, and the gate 700a. These constituents respectively replace the digital camera 100, the gate 200, and the gate 700.

(1) Construction of the Digital Camera 100a

Figure 10:
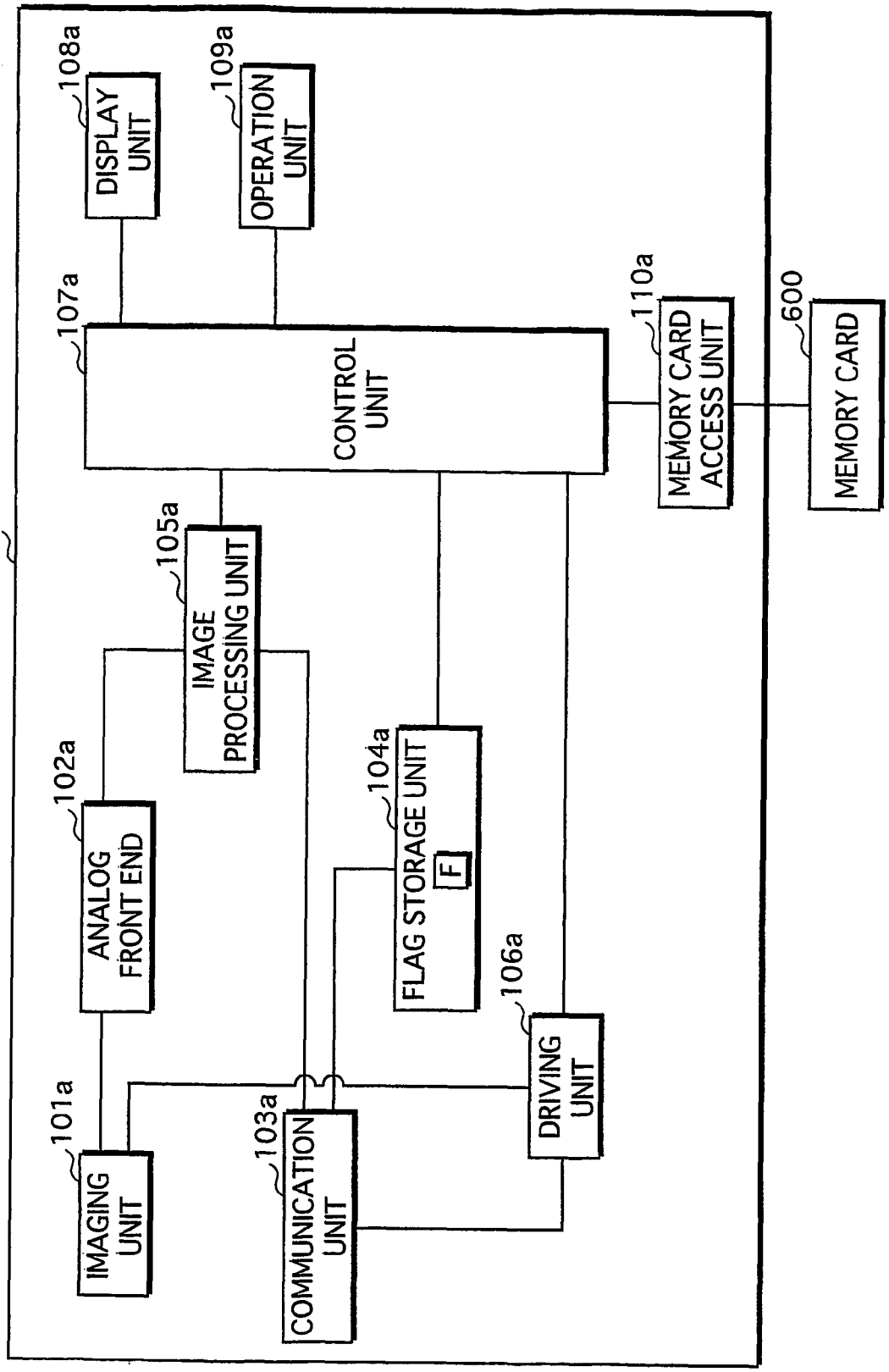

FIG. 10 is a functional block diagram illustrating a construction of the digital camera 100a. As shown in FIG. 10, the digital camera 100a is constituted by an imaging unit 101a, an analog front end 102a, a communication unit 103a, a flag storage unit 104a, an image processing unit 105a, a driving unit 106a, a control unit 107a, a display unit 108a, an operation unit 109a, and a memory card access unit 110a.

Here, the imaging unit 101a, the analog front end 102a, the communication unit 103a, the driving unit 106a, the display unit 108a, the operation unit 109a and the memory card access unit 110a respectively have the same functions as the imaging unit 101, the analog front end 102, the communication unit 103, the driving unit 106, the display unit 108, the operation unit 109, and the memory card access unit 110 in the digital camera 100.

The following part describes the flag storage unit 104a, the image processing unit 105a, and the control unit 107a which respectively have different functions from their corresponding constituents in the digital camera 100.

(a) The flag storage unit 104a has an area for storing flag information. The flag storage unit 104a does not store flag information (OFF) in an initial state. Here, the initial state means that the user carrying the digital camera 100a has not passed through the gate 200a.

When the user passes through the gate 200a with the digital camera 100a, the flag storage unit 104a receives flag control information indicating ON, through the communication unit 103a from the gate 200a. Thus, the flag storage unit 104a stores flag information (ON).

When the user passes through the gate 700a with the digital camera 100a, the flag storage unit 104a receives flag control information indicating OFF through the communication unit 103a from the gate 700a. Thus, the flag storage unit 104a deletes the stored flag information (OFF).

(b) The image processing unit 105a includes a microprocessor and the like, and has a function of performing image processing on a digital image signal received from the analog front end 102a, as well as the image processing unit 105 in the digital camera 100. Differently from the image processing unit 105, however, the image processing unit 105a does not perform image processing on a received digital image signal unconditionally. The image processing unit 105a performs image processing on a received digital image signal, and sends the processed digital image signal to the control unit 107a, only when the flag storage unit 104a stores flag information. If the flag storage unit 104a does not store flag information, the image processing unit 105a does not perform image processing on a received digital image signal, and sends the digital image signal to the control unit 107a as it is.

In detail, the image processing unit 105a receives the digital image signal corresponding to the object C from the analog front end 102a, and receives image processing information indicating an image-blurring operation from the communication unit 103a. Furthermore, the image processing unit 105a receives a signal indicating a state of the flag storage unit 104a, from the control unit 107a.

If the signal received from the control unit 107a indicates ON, the image processing unit 105a performs an image-blurring operation on the digital image signal, to generate the image data 140. The image processing unit 105a sends the image data 140 to the control unit 107a.

If the signal received from the control unit 107a indicates OFF, the image processing unit 105a sends the digital image signal received from the analog front end 102a to the control unit 107a as it is.

The same is true for a case where the image processing unit 105a receives the digital image signal 121 and the image processing information 122 corresponding to the object A, or the digital image signal 131 and the image processing information 132 corresponding to the object B. Which is to say, the image processing unit 105a judges whether to perform image processing, according to a signal which is received from the control unit 107a and indicates the state of the flag storage unit 104a.

(c) The control unit 107a includes a microprocessor, a ROM, a RAM, and the like, similarly to the control unit 107.

When receiving an operation signal indicating that a shutter release button has been pressed down from the operation unit 109a, the control unit 107a generates a control signal indicating the pressing, and sends the control signal to the driving unit 106a. Also, the control unit 107a examines a predetermined area in the flag storage unit 104a to judge whether the flag storage unit 104a stores flag information.

If the flag storage unit 104a stores flag information, the control unit 107a sends a signal indicating ON to the image processing unit 105a. If the flag storage unit 104a does not store flag information, the control unit 107a sends a signal indicating OFF to the image processing unit 105a.

The control unit 107a receives a digital image signal, or image data generated by performing image processing on a digital image signal, from the image processing unit 105a and writes the received digital image signal or image data into the memory card 600 through the memory card access unit 110a.

(2) Construction of the Gate 200a

The gate 200a is provided at an entrance of an exhibition hall as shown in FIG. 9. The gate 200a has the same construction as the gate 200 shown in FIG. 5. However, the gate 200a transmits different information to the digital camera 100a, from the gate 200. The gate 200a stores flag control information including an instruction to write flag information into the flag storage unit 104a. The gate 200a includes an antenna, to transmit the stored flag control information through a radio wave. The flag control information is transmitted from the antenna in the gate 200a to an antenna included in the communication unit 103a in the digital camera 100a.

If flag information is written into the flag storage unit 104a, the image processing unit 105a performs image processing on a digital image signal obtained based on photographing of an object, in accordance with image processing information the digital camera 100a receives from an IC tag during the photographing. To be specific, when the user carrying the digital camera 100a passes through the gate 200a to enter the exhibition hall, flag information is written into the digital camera 100a. After this, the image processing unit 105a performs image processing on a digital image signal.

Similarly to the shape of the gate 200, a shape of the gate 200a may be modified as long as the gate 200a is a computer system having the functions shown in FIG. 5.

(3) Construction of the Gate 700a

The gate 700a is provided at an exit of the exhibition hall, as well as the gate 700 (see FIG. 9). The gate 700a has the same construction as the gate 700, but transmits different information to the digital camera 100a, from the gate 700.

The gate 700a stores flag control information including an instruction to delete stored flag information. The gate 700a includes an antenna, to transmit the stored flag control information through a radio wave. The flag control information transmitted from the antenna in the gate 700a is received by the antenna included in the communication unit 103a in the digital camera 100a.

If flag information is deleted from the flag storage unit 104a, the image processing unit 105a sends a digital image signal obtained based on photographing of an object without performing image processing, even when receiving image processing information from an IC tag during the photographing. To be specific, when the user carrying the digital camera 100a passes through the gate 700a to leave the exhibition hall, flag information is deleted from the digital camera 100a. After this, the image processing unit 105a no longer performs image processing on a digital image signal.

As well as the shape of the gate 700, a shape of the gate 700a can be modified.

(4) Operation of the Digital Camera System 20

Figure 11:
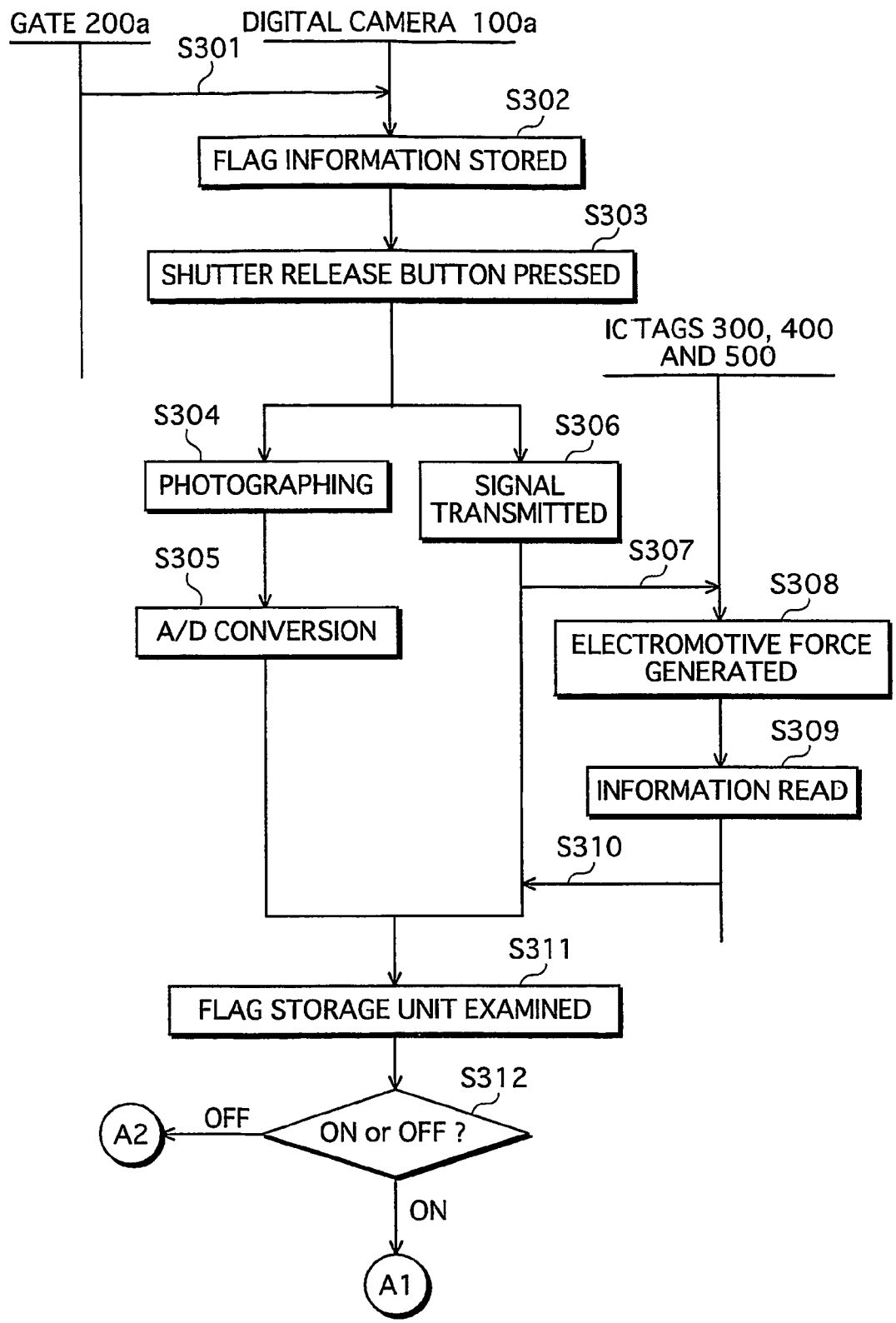
FIG. 11 is a flow chart illustrating an operation of the digital camera system 20, and the flow chart continues in FIG. 12.
Figure 12:
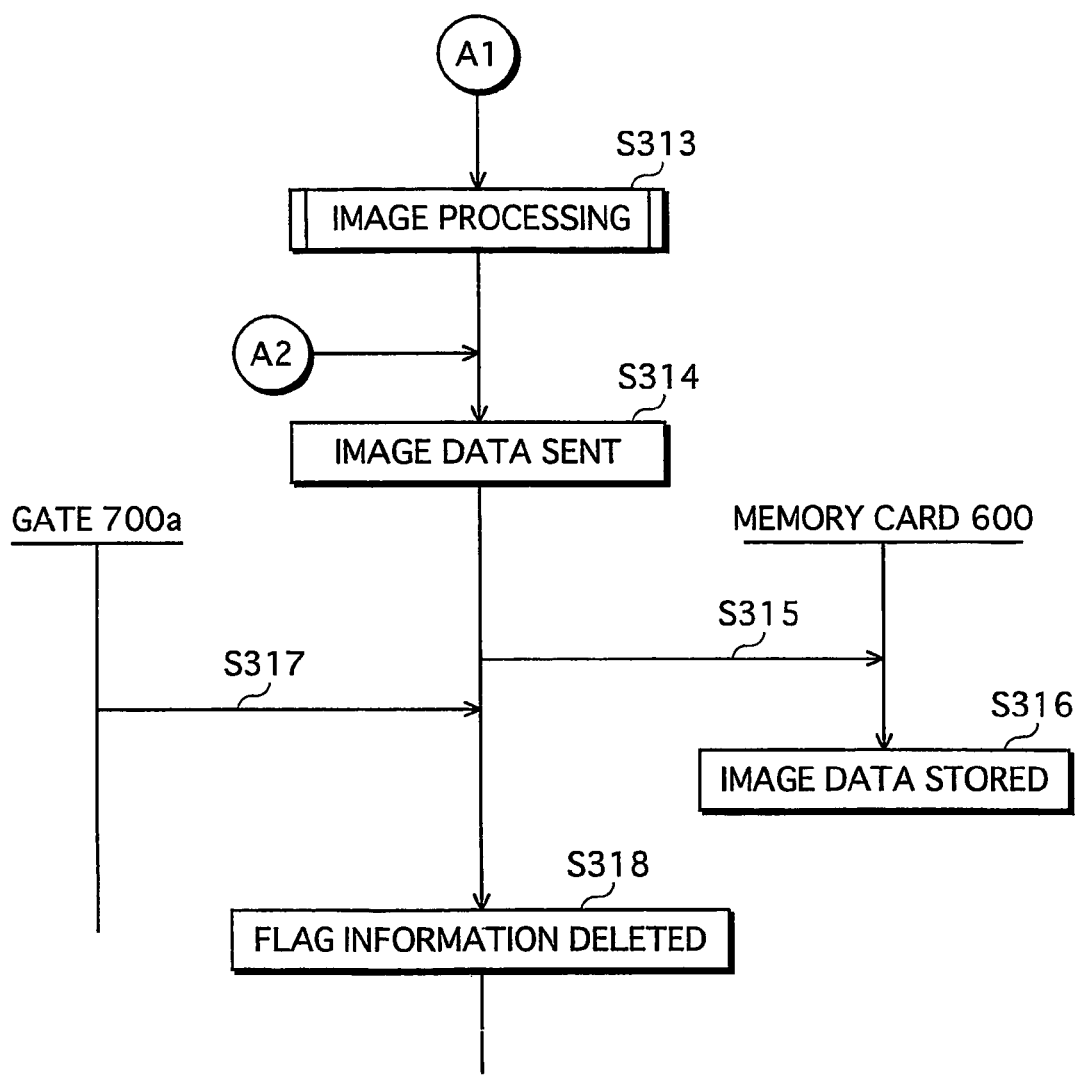
FIG. 12 is a flow chart illustrating the operation of the digital camera system 20.

FIGS. 11 and 12 are flow charts illustrating an operation of the digital camera system 20.

The gate 200a transmits flag control information indicating ON. The communication unit 103a in the digital camera 100a receives the flag control information from the gate 200a (step S301).

The communication unit 103a sends the received flag control information to the flag storage unit 104a. Then, the flag storage unit 104a executes an instruction included in the received flag control information, to store flag information (step S302).

When the user presses down a shutter release button in the operation unit 109a (step S303), the operation unit 109a generates an operation signal corresponding to the pressing, and sends the operation signal to the control unit 107a. The control unit 107a converts the operation signal into a control signal, and sends the control signal to the driving unit 106a. When receiving the control signal corresponding to the pressing of the shutter release button, the driving unit 106a generates a first signal and a second signal. The driving unit 106a sends the first signal to the imaging unit 101a, and the second signal to the communication unit 103a.

In accordance with the first signal, the imaging unit 101a photographs an object (step S304), to generate an image signal. The imaging unit 101a sends the image signal to the analog front end 102a. The analog front end 102a A/D converts the received image signal, to generate a digital image signal (step S305). The analog front end 102a sends the digital image signal to the image processing unit 105a.

In accordance with the second signal, the communication unit 103a transmits an activating signal to an IC tag (step S306). The IC tag corresponds to the object photographed in the step S304. For example, if the imaging unit 101a photographs the object A in the step S304, the communication unit 103a transmits the activating signal to the IC tag 300. If the imaging unit 101a photographs the object B, the communication unit 103a transmits the activating signal to the IC tag 400. If the imaging unit 101a photographs the object C, the communication unit 103a transmits the activating signal to the IC tag 500.

An antenna included in the IC tag receives the activating signal from the communication unit 103a of the digital camera 100a (step S307), and sends the received activating signal to an IC chip included in the IC tag. A rectifying unit in the IC chip generates an electromotive force by resonance (step S308), to supply power to other constituents of the IC chip.

A transmitting unit in the IC chip reads image processing information stored in a memory in the IC chip (step S309), and converts the read image processing information into a transmission signal. The IC tag transmits the transmission signal to the digital camera 100a. The communication unit 103a in the digital camera 100a receives the transmission signal (step S310). The communication unit 103a sends the received transmission signal, which indicates the image processing information, to the image processing unit 105a.

The control unit 107a reads a predetermined area in the flag storage unit 104a to judge whether flag information has been stored (ON or OFF) (step S311). The control unit 107a sends a signal indicating a result of the judgment to the image processing unit 105a.

If the signal indicates OFF (OFF:step S312), the next step is a step S314. If the signal indicates ON (ON:step S312), the image processing unit 105a subjects the digital image signal received from the analog front end 102a to image processing in accordance with the image processing information received from the communication unit 103a, to generate image data (step S313).

The control unit 107a receives the generated image data from the image processing unit 105a, and sends the image data to the memory card access unit 110a (step S314).

The memory card access unit 110a sends the received image data to the memory card 600. The memory card 600 receives the image data (step S315), and stores the image data (step S316).

The communication unit 103a of the digital camera 100a receives flag control information indicating OFF transmitted from the gate 700a (step S317).

The communication unit 103a in the digital camera 100a sends the received flag control information to the flag storage unit 104a. The flag storage unit 104a executes an instruction included in the received flag control information indicating OFF, to delete the stored flag information (step S318).

(5) Image Processing

Figure 13:
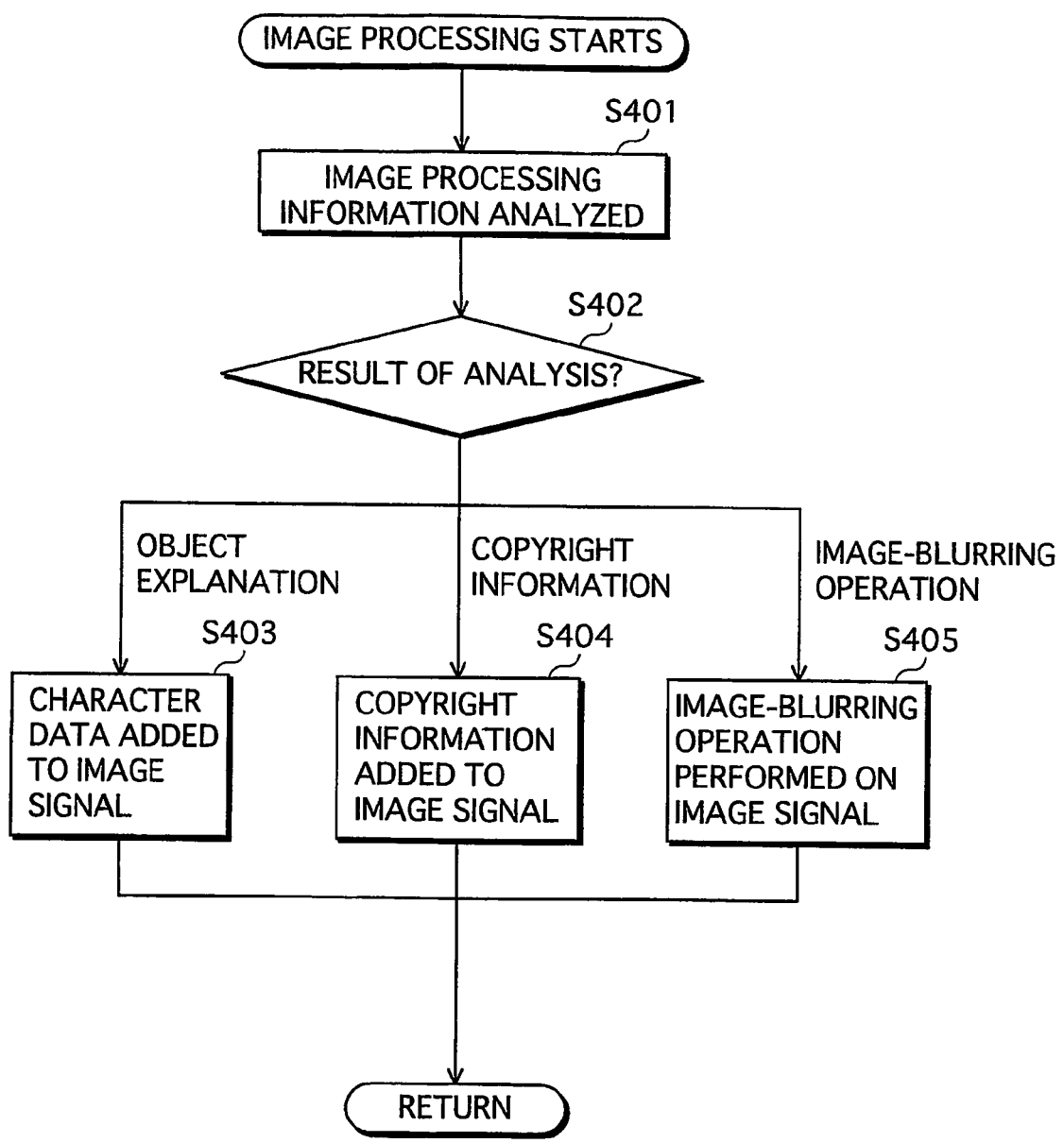

FIG. 13 is a flow chart illustrating image processing performed by the digital camera 100a. The following part describes the step S313 of the flow chart shown in FIG. 12 in detail.

The image processing unit 105a analyzes the image processing information received from the communication unit 103a (step S401).

When the image processing information indicates an explanation about the object (OBJECT EXPLANATION: step S402), the image processing unit 105a generates the image data by adding character data which shows the explanation about the object to the digital image signal (step S403). The image processing unit 105a sends the generated image data to the control unit 107a.

When the image processing information indicates copyright information regarding the object (COPYRIGHT. INFORMATION: step S402), the image processing unit 105a generates the image data by adding the copyright information to the digital image signal (step S404). The image processing unit 105a sends the generated image data to the control unit 107a.

When the image processing information is a program to perform an image-blurring operation (IMAGE-BLURRING OPERATION: step S402), the image processing unit 105a generates the image data by performing an image-blurring operation on the digital image signal in accordance with the program (step S405). The image processing unit 105a sends the generated image data to the control unit 107a. After this, the operation proceeds to the step S314, and continues.

2. System Including Digital Camera 100b

The following part describes a digital camera system, which is another modification example. This digital camera system is the same as the digital camera system 20, except for having a digital camera 100b (shown in FIG. 14), a gate 200b (not shown), and a gate 700b (not shown) instead of the digital camera 100a, the gate 200a, and the gate 700a.

(1) Construction of the Digital Camera 100b

Figure 14:
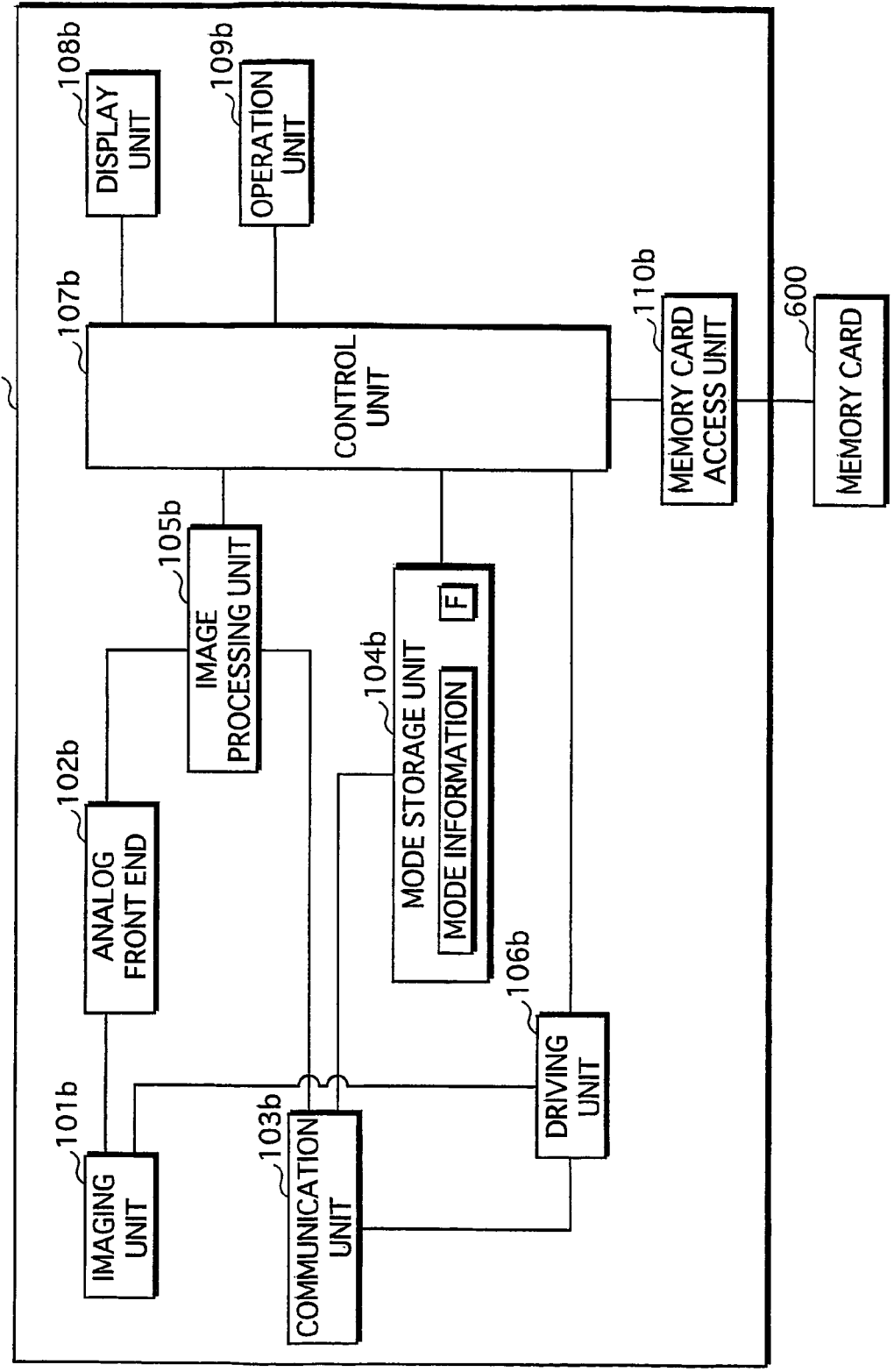
FIG. 14 is a functional block diagram illustrating a construction of a digital camera 100b.

As shown in FIG. 14, the digital camera 100b is constituted by an imaging unit 101b, an analog front end 102b, a communication unit 103b, a mode storage unit 104b, an image processing unit 105b, a driving unit 106b, a control unit 107b, a display unit 108b, an operation unit 109b, and a memory card access unit 110b.

Here, the imaging unit 101b, the analog front end 102b, the communication unit 103b, the driving unit 106b, the display unit 108b, the operation unit 109b, and the memory card access unit 110b respectively have the same functions as their corresponding constituents of the digital camera 100. The image processing unit 105b has the same function as the image processing unit 105a in the digital camera 100a.

The following part describes the mode storage unit 104b and the control unit 107b which respectively have different functions from their corresponding constituents in the digital cameras 100 and 100a.

(a) The mode storage unit 104b has the same functions as the mode storage unit 104 in the digital camera 100 and the flag storage unit 104a in the digital camera 100a. Therefore, the mode storage unit 104b stores mode information, and also has an area for storing flag information.

Here, mode information is related to the number of pixels, and indicates one of the selection mode and the fixed mode/100 megapixels.

In an initial state, the mode storage unit 104b stores mode information indicating the selection mode, and does not store flag information (OFF) Here, the initial state means that the user carrying the digital camera 100b has not passed the gate 200b.

When the user passes through the gate 200b to enter an exhibition hall with the digital camera 100b, the mode storage unit 104b receives mode information indicating the fixed mode/100 megapixels from the gate 200b through the communication unit 103b. The mode storage unit 104b replaces the stored mode information indicating the selection mode, with the currently received mode information indicating the fixed mode/100 megapixels.

Furthermore, the mode storage unit 104b receives flag control information indicating ON through the communication unit 103b from the gate 200b. Thus, the mode storage unit 104b stores flag information in a predetermined area.

When the user passes through the gate 700b with the digital camera 100b to leave the exhibition hall, the mode storage unit 104b receives mode information indicating the selection mode from the gate 700b through the communication unit 103b. The mode storage unit 104b replaces the mode information indicating the fixed mode/100 megapixels, with the currently received mode information indicating the selection mode.

Furthermore, the mode storage unit 104b receives flag control information indicating OFF through the communication unit 103b from the gate 700b. Thus, the mode storage unit 104b deletes the stored flag information from the predetermined area.

(b) The control, unit 107b includes a microprocessor, a ROM, a RAM, and the like.

When receiving an operation signal indicating that a shutter release button is pressed down from the operation unit 109b, the control unit 107b generates a control signal indicating the pressing, and sends the control signal to the driving unit 106b. The control unit 107b further examines the predetermined area in the mode storage unit 104b in order to judge whether the mode storage unit 104b stores flag information.

If the mode storage unit 104b stores flag information, the control unit 107b sends a signal indicating ON to the image processing unit 105b. If the mode storage unit 104b does not store flag information, the control unit 107b sends a signal indicating OFF to the image processing unit 105b.

When receiving a digital image signal, or image data generated by performing image processing on a digital image signal from the image processing unit 105b, the control unit 107b reads mode information from the mode storage unit 104b. Here, the read mode information indicates the fixed mode/100 megapixels.

The control unit 107b performs an appropriate processing on the received digital image signal or image data, so that the digital image signal or image data has 100 megapixels. Then, the control unit 107b writes the processed digital image signal or image data into the memory card 600 through the memory card access unit 110b.

If the mode information read from the mode storage unit 104b indicates the selection mode, the control unit 107b performs an appropriate processing on the digital image signal or image data received from the image processing unit 105b so that the digital image signal or image data has the specific number of pixels. Here, the specific number of pixels is stored in the control unit 107b.

(2) Construction of the Gate 200b

The gate 200b is provided at an entrance of the exhibition hall, similarly to the gates 200 and 200a. The gate 200b has the same construction as the gate 200 shown in FIG. 5.

However, the gate 200b transmits different information to the digital camera 100b, from the gates 200 and 200a. In detail, information transmitted from the gate 200b to the digital camera 100b includes both the information transmitted from the gate 200 to the digital camera 100, and the information transmitted from the gate 200a to the digital camera 100a.

To be further specific, the gate 200b stores mode information indicating the fixed mode/100 megapixels and flag control information including an instruction to store flag information into the digital camera 100b. The gate 200b includes an antenna as well as the gates 200 and 200a, to transmit the stored mode information and flag control information through a radio wave. The mode information and flag control information is transmitted from the antenna in the gate 200b to an antenna included in the communication unit 103b in the digital camera 100b.

Similarly to the shapes of the gates 200 and 200a, a shape of the gate 200b can be modified as long as the gate 200b is a computer system having the functions shown in FIG. 5.

(3) Construction of the Gate 700b

The gate 700b is provided at an exit of the exhibition hall, as well as the gates 700 and 700a. The gate 700b has the same construction as the gate 700.

However, the gate 700b transmits different information to the digital camera 100b, from the gates 700 and 700a. In detail, information transmitted from the gate 700b to the digital camera 100b includes both the information transmitted from the gate 700 to the digital camera 100 and the information transmitted from the gate 700a to the digital camera 100a.

To be further specific, the gate 700b stores mode information indicating the selection mode, and flag control information including an instruction to delete flag information from the digital camera 100b. The gate 700b includes an antenna as well as the gates 700 and 700a, to transmit the stored mode information and flag control information through a radio wave. The mode information and flag control information transmitted from the antenna in the gate 700b is received by the antenna included in the communication unit 103b in the digital camera 100b.

As well as the shapes of the gates 700 and 700a, a shape of the gate 700b can be modified as long as the gate 700b is a computer system having the functions shown in FIG. 5.

(4) Operation of the System Including the Digital Camera 100b

Figure 15:
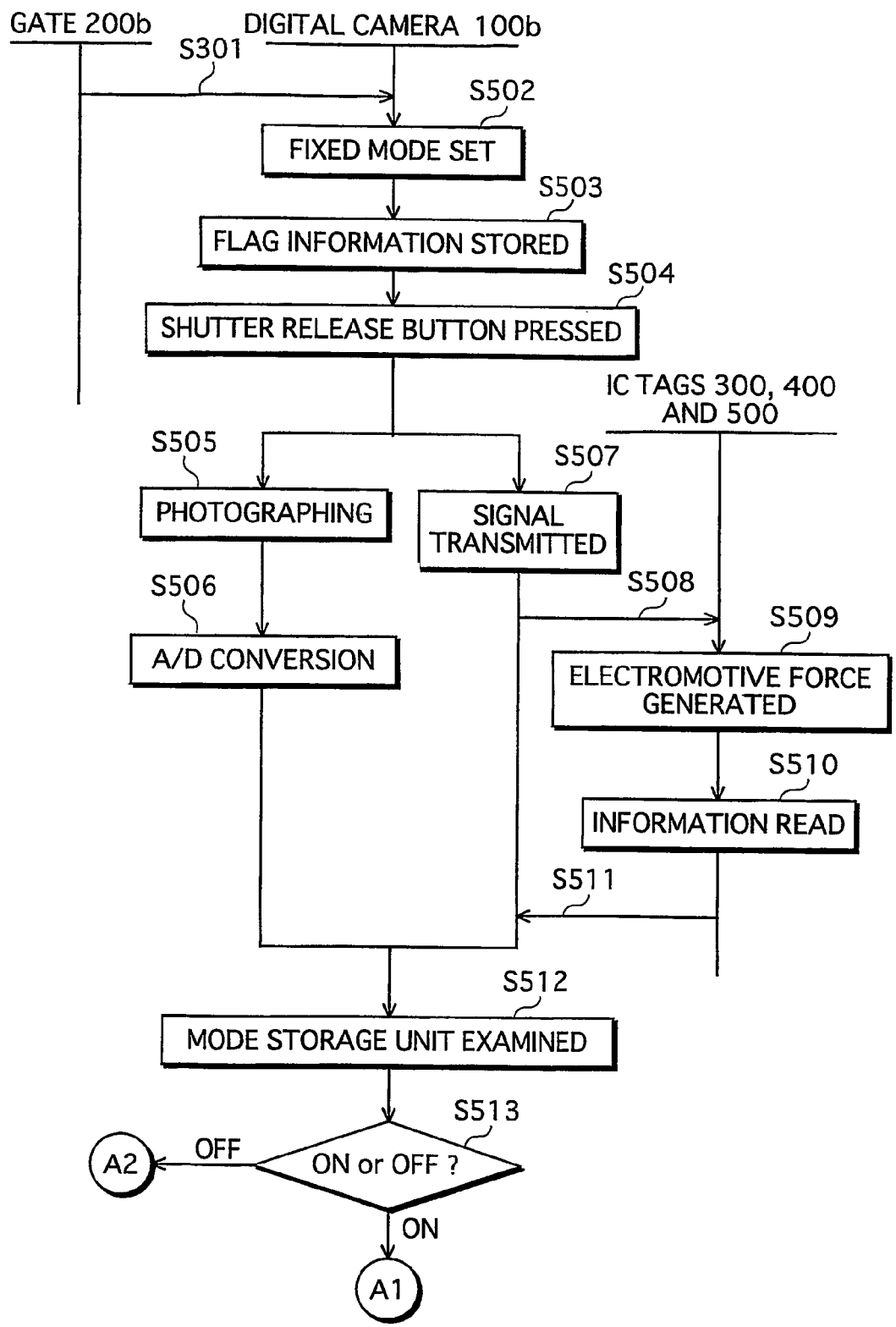
FIG. 15 is a flow chart illustrating an operation of a system including the digital camera 100b, and the flow chart continues in FIG. 16.
Figure 16:
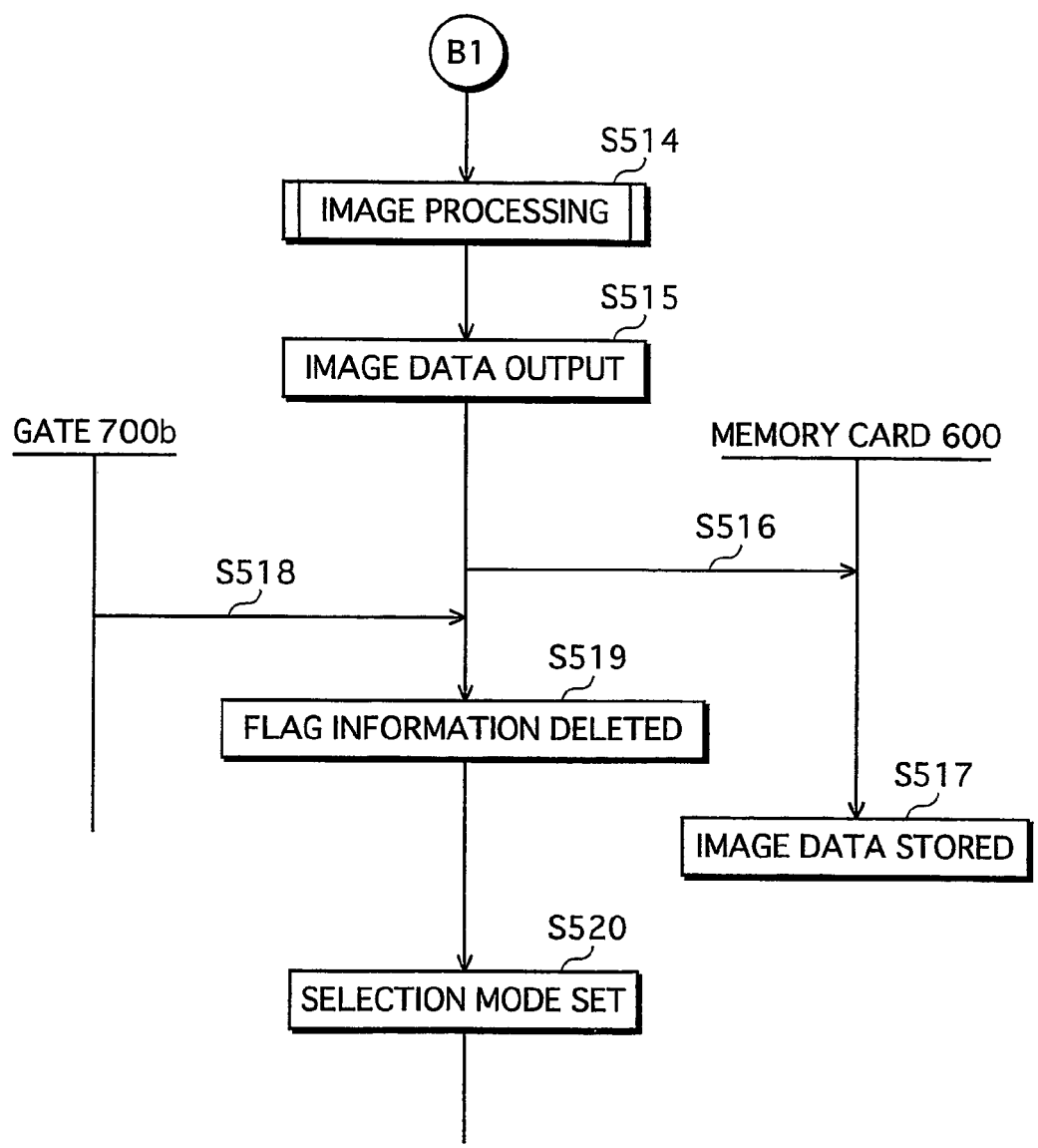
FIG. 16 is a flow chart illustrating the operation of the system including the digital camera 100b.

FIGS. 15 and 16 are flow charts illustrating an operation of the system including the digital camera 100b.

The gate 200b transmits mode information indicating the fixed mode/100 megapixels and flag control information indicating ON. The communication unit 103b in the digital camera 100b receives the mode information and the flag control information from the gate 200b (step S501).

The communication unit 103b sends the received mode information and flag control information to the mode storage unit 104b. The mode storage unit 104b replaces stored mode information with the currently received mode information indicating the fixed mode/100 megapixels (step S502). In addition, the mode storage unit 104b executes an instruction included in the currently received flag control information, to store flag information in a predetermined area (step S503).

When the user presses down a shutter release button in the operation unit 109b (step S504), the operation unit 109b generates an operation signal corresponding to the pressing, and sends the operation signal to the control unit 107b. The control unit 107b converts the operation signal into a control signal, and sends the control signal to the driving unit 106b. The driving unit 106b then generates a first signal and a second signal. The driving unit 106b sends the first signal to the imaging unit 101b, and the second signal to the communication unit 103b.

In accordance with the first signal, the imaging unit 101b photographs an object (step S505), to generate an image signal. The imaging unit 101b sends the image signal to the analog front end 102b. The analog front end 102b A/D converts the received image signal, to generate a digital image signal (step S506). The analog front end 102b sends the generated digital image signal to the image processing unit 105b.

In accordance with the second signal, the communication unit 103b transmits an activating signal to an IC tag (step S507). Here, the IC tag corresponds to the object photographed in the step S505. For example, if the imaging unit 101b photographs the object A in the step S505, the communication unit 103b transmits the activating signal to the IC tag 300. If the imaging unit 101b photographs the object B, the communication unit 103b transmits the activating signal to the IC tag 400. If the imaging unit 101b photographs the object C, the communication unit 103b transmits the activating signal to the IC tag 500.

An antenna included in the IC tag receives the activating signal from the communication unit 103b of the digital camera 100b (step S508), and sends the received activating signal to an IC chip included in the IC tag. A rectifying unit in the IC chip generates an electromotive force by resonance (step S509), to supply power to other constituents of the IC chip.

A transmitting unit in the IC chip reads image processing information stored in a memory in the IC chip (step S510), and converts the read image processing information into a transmission signal. The IC tag transmits the transmission signal to the digital camera 100b. The communication unit 103b in the digital camera 100b receives the transmission signal (step S511). The communication unit 103b sends the received transmission signal, which indicates the image processing information, to the image processing unit 105b.

The control unit 107b reads a predetermined area in the mode storage unit 104b to judge whether flag information has been stored (step S512) The control unit 107b sends a signal indicating a result of the judgment to the image processing unit 105b.

If the signal indicates OFF (OFF:step S513), the next step is a step S606 shown in FIG. 17. If the signal indicates ON (ON: step S513), the image processing unit 105b subjects the digital image signal received from the analog front end 102b to image processing in accordance with the image processing information received from the communication unit 103b, to generate image data (step S514).

The control unit 107b sends the image data to the memory card access unit 110b (step S515).

The memory card access unit 110b sends the received image data to the memory card 600. The memory card 600 receives the image data (step S516), and stores the image data (step S517).

The gate 700b transmits mode information indicating the selection mode and flag control information indicating OFF. The communication unit 103b of the digital camera 100b receives the mode information and flag control information from the gate 700b (step S518).

The communication unit 103b in the digital camera 100b sends the received mode information and flag control information to the mode storage unit 104b. The mode storage unit 104b executes an instruction included in the received flag control information, to delete the stored flag information (step S519). Furthermore, the mode storage unit 104b replaces the stored mode information with the currently received mode information indicating the selection mode (step S520).

(5) Image Processing

FIG. 17 is a flow chart illustrating image processing performed by the digital camera 100b. The following part describes the step S514 of the flow chart shown in FIG. 16 in detail.

The image processing unit 105b analyzes the image processing information received from the communication unit 103b (step S601).

When the image processing information indicates an explanation about the object (OBJECT EXPLANATION: step S602), the image processing unit 105b generates the image data by adding character data which shows the explanation about the object to the digital image signal (step S603). The image processing unit 105b sends the generated image data to the control unit 107b.

When the image processing information indicates copyright information regarding the object (COPYRIGHT INFORMATION: step S602), the image processing unit 105b generates the image data by adding the copyright information to the digital image signal (step S604). The image processing unit 105b sends the generated image data to the control unit 107b.

When the image processing information is a program to perform an image-blurring operation (IMAGE-BLURRING OPERATION: step S602), the image processing unit 105b generates the image data by performing an image-blurring operation on the digital image signal in accordance with the program (step S605). The image processing unit 105b sends the generated image data to the control unit 107b.

After this, the control unit 107b reads the mode information stored in the mode storage unit 104b (step S606). The control unit 107b performs an appropriate processing on the image data received from the image processing unit 105b, so that the image data has the number of pixels specified by the read mode information (step S607). Then, the operation proceeds to the step S515, and continues.

3. Other Modification Examples (a) According to the above-described modification examples, after the digital camera (100a and 100b) receives information from the gate (200a and 200b) provided at the entrance of the exhibition hall, image processing is performed in accordance with image processing information received from the IC tag (300, 400 and 500). However, this construction may be modified in such a manner that image processing is prohibited after the digital camera (100a and 100b) receives information from the gate (200a and 200b).

Likewise, according to the above-described modification examples, after the digital camera (100a and 100b) receives information from the gate (700a and 700b) provided at the exit of the exhibition hall, image processing in accordance with image processing information received from the IC tag (300, 400 and 500) is prohibited. However, this construction may be modified in such a manner that image processing is performed after the digital camera (100a and 100b) receives information from the gate (700a and 700b).

(b) The above-described modification examples may be further modified in the following manner. After receiving flag control information from the gate (200a and 200b), the digital camera (100a and 100b) may generate image data by photographing an object, but does not send the image data to the memory card 600. Instead, the digital camera (100a and 100b) discards the generated image data, so that the image data is not written into the memory card 600.

(c) According to the above-described modification examples, the digital camera (100a and 100b) judges whether having received information from the gate (200a, 200b, 700a and 700b), based on presence or absence of flag information in the digital camera (100a and 100b). Here, the gate (200a, 200b, 700a and 700b) may transmit flag control information to the digital camera (100a and 100b) which indicates zero or one. Here, flag control information indicating zero means that flag information is not stored, and flag control information indicating one means flag information is stored. To be specific, the digital camera (100a and 100b) receives flag control information indicating one from the gate (200a and 200b) at the entrance, and receives flag control information indicating zero from the gate (700a and 700b) at the exit. In this way, the digital camera system 20 and the system including the digital camera 100b can be also realized.

It should be noted that the digital camera (100a and 100b) does not necessarily use a flag to judge whether the user with the digital camera (100a and 100b) has passed the gate (200a, 200b, 700a and 700b). The digital camera (100a and 100b) may use different means.

(d) The present invention includes a combination of the digital camera system 20, the system including the digital camera 100b, and the system described in (b).

If such is the case, a digital camera receives flag control information indicating zero, one, or two, from a gate provided at an entrance of an exhibition hall. If the received flag control information indicates zero, the digital camera photographs an object, to generate image data, but discards the image data. If the received flag control information indicates one, the digital camera photographs an object, to generate image data, and sends the image data without processing, to a memory card. If the received flag control information indicates two, the digital camera photographs an object, to generate image data, subjects the image data to image processing in accordance with image processing information received from an IC tag, and then sends the resulting image data to a memory card.

(Other Modifications)

As described above, the present invention provides a digital camera system which can perform image processing on image data generated by a digital camera, regardless of an intention of a user of the digital camera.

The above embodiment and modification examples only serve as an example. The present invention is not limited to such, and further includes the following modifications.

(1) The present invention may provide a system including a digital camera and an IC tag, without a gate. Furthermore, the present invention may provide a system including a digital camera and a gate, without an IC tag.

(2) According to the above embodiment and the modification examples, the IC tag 300, the IC tag 400, and the IC tag 500 respectively store, as image processing information, the character data showing the explanation about the object A, the copyright information regarding the object B, and the program to perform an image-blurring operation. However, the image processing information stored in the IC tags 300, 400 and 500 is not limited to these examples.

For example, the image processing information may indicate information about a place at which an image is taken, sightseeing information, an explanation about a building, information about a product, an advertisement, a relating URL, and the like. The image processing unit (105, 105a and 105b) may be configured to add, to a digital image signal, extra information showing these kinds of information.

Furthermore, the image processing information may indicate copyright information indicating copy permission, copy prohibition, the number of times copying is permitted, or the like. The image processing unit (105, 105a and 105b) may be configured to add, to a digital image signal, extra information showing such copyright information.

Also, the image processing information may indicate copyright information showing permission of storing image data into a memory, prohibition of storing image data into a memory, or the like. The image processing unit 105 in the digital camera 100 may add such copyright information to a digital image signal. In this case, the control unit in the memory card 600 may be configured to judge whether to permit writing of image data into the storage unit, or discard image data in order to prevent the image data from being written into the storage unit, according to the added copyright information.

Furthermore, the image processing information may be information or a program relating to image processing such as painting an image all black, tone conversion, conversion of an image quality, and conversion of the number of pixels.

(3) Furthermore, the image processing information may be a program to cause a computer to perform a predetermined procedure, or a program to cause a predetermined application software to be activated, when an image file for image data obtained by the digital camera (100, 100a and 100b) is opened by a personal computer or the like using a software.

To be specific, the image processing information may indicate a program to cause an application software to be activated, to generate a log, when an image file is opened, a program for transferring the generated log, a program to cause an application software to be activated to automatically create a copy of an image in an image file, when the image file is opened, a program to attach the copy of Thelma to an e-mail to send the copy, or a program to automatically delete an image in an image file, when the image file is opened.

(4) According to the above embodiment, the gate 200 and the gate 700 respectively store mode information indicating the fixed mode/100 megapixels and mode information indicating the selection mode, and are each configured to transmit the stored mode information. Instead of the mode information indicating the fixed mode/100 megapixels, however, the gate 200 may store the following image processing information, and transmit the stored image processing information.

The gate 200 may store information about a site at which an image is taken, sightseeing information, an explanation about a building, a relating URL, copyright information indicating copy permission, copy prohibition, the number of times copying is permitted or the like, or copyright information showing permission of storing image data into a memory, prohibition of storing image data into a memory or the like. Furthermore, the gate 200 may store information or a program relating to image processing such as an image-blurring operation, painting an image all black, tone conversion, conversion of an image quality, and conversion of the number of pixels. In addition, the gate 200 may store a program to cause a computer to perform a predetermined procedure, or a program to cause a predetermined application software to be activated, when an image file for image data obtained by the digital camera 100 is opened by a personal computer or the like using a software.

When the digital camera 100 receives such image processing information from the gate 200, the image processing unit 105 performs image processing in accordance with the received image processing information. The mode storage unit 104 in the digital camera 100 may store the image processing information received from the gate 200, and the image processing unit 105 performs image processing in accordance with the image processing information stored in the mode storage unit 104. Furthermore, the gate 700 may transmit data, to the digital camera 100, to deactivate image processing in accordance with the image processing information transmitted from the gate 200. When receiving such deactivating data from the gate 700, the digital camera 100 may delete the image processing information stored in the mode storage unit 104.

(5) According to the above embodiment and modification examples, the image processing unit (105, 105a and 105b) is included in the digital camera (100, 100a and 100b). However, the image processing unit (105, 105a and 105b) may be included in the memory card 600. If such is the case, the digital camera (100, 100a and 100b) sends a digital image signal and received image processing information, to the memory card 600. The image processing unit (105, 105a and 105b) in the memory card 600 generates image data by performing image processing on the received digital image signal, and stores the generated image data.

(6) According to the above embodiment and modification examples, the image processing unit (105, 105a and 105b) and the communication unit (103, 103a and 103b) are included in the digital camera (100, 100a and 100b). However, the image processing unit (105, 105a and 105b) and the communication unit (103, 103a and 103b) may be included in the memory card 600.

(7) The digital camera (100, 100a and 100b) may have a function as a mobile telephone which performs radio communication. In other words, the digital camera (100, 100a and 100b) may be a camera-equipped mobile telephone.

(8) The digital camera system (10 and 20) may be utilized to prevent "digital shoplifting" using a camera-equipped mobile telephone.

If such is the case, the digital camera system (10 and 20) may include a terminal that generates a warning sound. If a user photographs an object using a camera-equipped mobile telephone, a communication unit in the camera-equipped mobile telephone transmits a signal to the terminal which is provided near the object. When receiving the signal, the terminal generates a warning sound.

(9) To prevent the communication unit 103 in the digital camera 100 from communicating with an IC tag which does not belong an object the digital camera 100 is going to photograph, the communication unit 103 may transmit a radio wave which has directivity in a direction in which the lens included in the imaging unit 101 faces.

Alternatively, the imaging unit 101 may measure a distance between the digital camera 100 and an object while focusing. The communication unit 103 transmits a radio wave having an intensity strong enough to travel the distance measured by the imaging unit 101. Thus, it is only the targeted IC tag which generates an electromotive force in response to the radio wave transmitted from the communication unit 103.

(10) The digital camera 100 may judge whether the user with the digital camera 100 passes through the gate 200, or only passes nearby the gate 200, in order to prevent the digital camera 100 from storing inappropriate mode information. This is realized in such a manner that a transmission device transmitting a signal to the digital camera 100 may be provided outside the gate 200 and inside the gate 200. When receiving a signal from the transmission device provided outside the gate 200, and then a signal from the transmission device provided inside the gate 200, the digital camera 100 judges that the user carrying the digital camera 100 has entered the exhibition hall through the gate 200, and rewrites the stored mode information.

The same modification is applicable to the gate 700. A transmission device transmitting a signal may be provided inside the gate 700, and outside the gate 700. When receiving a signal from the transmission device provided inside the gate 700 and then a signal from the transmission device provided outside the gate 700, the digital camera 100 judges that the user has left the exhibition hall through the gate 700 with the digital camera 100, and rewrites the stored mode information.

(11) According to the above embodiment and modification examples, the digital camera (100, 100a and 100b) receives a program to perform image processing from the IC tag (500). However, a program to perform image processing may be prestored in the digital camera (100, 100a and 100b). In this case, the digital camera (100, 100a and 100b) may receive information to activate the program, from the IC tag (500).

(12) The digital camera (100, 100a and 100b) may communicate with the IC tag (300, 400 and 500) and the gate (200, 200a, 200b, 700, 700a and 700b), not only using a radio wave or microwave, but through optical communication using infrared rays.

(13) The present invention may be a method described in the embodiment and modification examples, a computer program realizing the method using a computer, or digital signals representing the computer program.

The present invention may be a computer-readable storage medium such as a floppy disc, a hard disc, a CD-ROM, an MO, a DVD, a DVD-ROM, a DVD-RAM, a Blu-ray disc (BD), a semiconductor memory or the like storing the computer program or the digital signals. Alternatively, the present invention may be the computer program or the digital signals in a state of being stored in the above-mentioned computer-readable storage medium.

The present invention may be transmission of the computer program or the digital signals through a network, such as a telecommunication line, a wireless or wired network, and the Internet.

The present invention may be a computer system including a microprocessor and a memory storing the computer program. Here, the microprocessor may operate in accordance with the computer program.

The computer program or the digital signals may be executed in a different independent computer system. If such is the case, the computer program or the digital signals may be stored in the above-mentioned computer-readable storage medium, and then transported. Alternatively, the computer program or the digital signals may be transmitted through the above-mentioned network.

(14) The above-described embodiment may be combined with any of the modification examples.

INDUSTRIAL APPLICABILITY

The present invention can be used for preventing "digital shoplifting", and for providing information and an advertisement about a product that is photographed.

The invention claimed is:
1. A digital camera comprising:
an imaging unit operable to generate an image by photographing an object;
a receiving unit operable to receive first information and second information relating to image processing from one or more transmission devices, wherein the second information indicates image modification corresponding to the object;
a judging unit operable to judge whether the image is (i) to be output, (ii) to be processed and output, or (iii) not to be output, based on the information received by the receiving unit; and an output unit operable to, in accordance with the judgment made by the judging unit, (i) output the image to a memory, (ii) process and output the image to the memory, or (iii) discard the image, the memory being readable by the digital camera or an external device, wherein the receiving unit receives the first information from a first transmission device, and receives the second information from a second transmission device, wherein the judging unit makes the judgment based on the first information, wherein if the judging unit judges that the image is to be processed and output, the output unit performs the image modification indicated by the second information on the image, and outputs the modified image to the memory, wherein the output unit performs the image modification to make the modified image visually distinguishable from the image before the image modification, wherein the first information includes information indicating image modification, wherein, when the receiving unit receives the second information, the judging unit examines whether the receiving unit has received the first information, and wherein, if the receiving unit has received the first information, the judging unit judges that the image is to be processed and output, and the output unit performs the image modification indicated by the first information on the image, in addition to the image modification indicated by the second information.

2. A digital camera comprising:

an imaging unit operable to generate an image by photographing an object;

a receiving unit operable to receive first information and second information relating to image processing from one or more transmission devices, wherein the second information indicates image modification corresponding to the object;

a judging unit operable to judge whether the image is (i) to be output, (ii) to be processed and output, or (iii) not to be output, based on the information received by the receiving unit; and an output unit operable to, in accordance with the judgment (i) output the image to a memory, (ii) process and output the image to the memory, or (iii) discard the image, the memory being readable by the digital camera or an external device, wherein the receiving unit receives the first information from a first transmission device, and receives the second information from a second transmission device, wherein the judging unit makes the judgment based on the first information, wherein if the judging unit judges that the image is to be processed and output, the output unit performs the image modification indicated by the second information on the image, and outputs the modified image to the memory, wherein the first transmission device is a gate which prestores the first information, and through which a user carrying the digital camera passes, and wherein the second transmission device is an IC tag which prestores the second information, and which is attached to, hung around, or provided near the object.

3. The digital camera of claim 2, further comprising:
a driving unit operable to, when detecting that a shutter release button included in the digital camera is pressed down, cause the imaging unit and the receiving unit to operate concurrently.

4. The digital camera of claim 3, wherein
the digital camera is operable to function as a mobile telephone for performing radio communication.

5. A digital camera system comprising a digital camera that photographs an object, a first transmission device that is attached to, hung around, or provided near the object, and a second transmission device,
wherein the digital camera includes:
an imaging unit operable to generate an image by photographing the object;
a receiving unit operable to receive first information, the first information indicating image processing corresponding to the object, from the first transmission device;
a judging unit operable to, based on the first information, judge whether the image is to be (i) output without being processed, (ii) processed and output, or (iii) not to be output; and
an output unit operable to, in accordance with the judgment made by the judging unit, (i) output the image to a memory without processing, (ii) process and output the image to the memory, or (iii) discard the image, the memory being readable by the digital camera or an external device,
wherein the first transmission device includes:
a first storing unit which prestores the first information; and
a first transmission unit operable to transmit the first information to the digital camera,
wherein the second transmission device includes:
a second storing unit which prestores second information relating to image modification; and
a second transmission unit operable to transmit the second information to the digital camera,
wherein the receiving unit is further operable to receive the second information from the second transmission device when a user carrying the digital camera passes through the second transmission device, and
wherein when the judging unit judges that the image is to be processed and output, the output unit performs the image modification indicated by the second information on the image in addition to the image processing indicated by the first information, and then outputs the modified image to the memory.

6. The digital camera system of claim 5, wherein
the digital camera is operable to function as a mobile telephone for performing radio communication.

7. The digital camera system of claim 6, further including a terminal that generates a warning sound, the terminal being provided near the object, wherein
the digital camera sends a signal to the terminal concurrently with the generation of the image by the imaging unit, and
the terminal comprises:
a signal receiving unit operable to receive the signal from the digital camera; and
a sound generating unit operable to generate the warning sound, when the signal receiving unit receives the signal.

* * * * *